(12) United States Patent
Guo et al.

(10) Patent No.: US 10,422,361 B2
(45) Date of Patent: Sep. 24, 2019

(54) REGENERATIVE ENERGY CAPTURING AND LAUNCHING ASSISTANT

(71) Applicant: CNH Industrial America LLC, New Holland, PA (US)

(72) Inventors: Haibo Guo, Naperville, IL (US); Cecil A. Weeramantry, Walnut Creek, CA (US)

(73) Assignee: CNH Industrial America LLC, New Holland, PA (US)

( * ) Notice: Subject to any disclaimer, the term of this patent is extended or adjusted under 35 U.S.C. 154(b) by 338 days.

(21) Appl. No.: 15/378,698

(22) Filed: Dec. 14, 2016

(65) Prior Publication Data
US 2018/0163753 A1   Jun. 14, 2018

(51) Int. Cl.
*F15B 21/14*  (2006.01)
*B60K 6/12*  (2006.01)
(Continued)

(52) U.S. Cl.
CPC ............... *F15B 21/14* (2013.01); *B60K 6/12* (2013.01); *B60L 7/24* (2013.01); *B60T 13/14* (2013.01);
(Continued)

(58) Field of Classification Search
CPC ......... F15B 21/14; F15B 11/08; F15B 1/033; F15B 2211/7058; B60W 30/18127;
(Continued)

(56) References Cited

U.S. PATENT DOCUMENTS 3,205,659 A   9/1965  Hartzell
3,262,513 A   7/1966  Henriksson et al.
(Continued)

FOREIGN PATENT DOCUMENTS

EP   2471679 A2   7/2012
EP   3012165 A1   4/2016
(Continued)

OTHER PUBLICATIONS

European Search Report for European Application No. 17207211.8, dated May 29, 2018 (7 pages).

*Primary Examiner* — Thomas E Lazo
*Assistant Examiner* — Dustin T Nguyen
(74) *Attorney, Agent, or Firm* — Peter K. Zacharias; Patrick M. Sheldrake

(57) ABSTRACT

An agricultural, construction, or industrial vehicle or machine has a driveline including an engine, a power-shuttle transmission connected to the engine, and at least one drive axle driven by an output shaft of the power-shuttle transmission. The power-shuttle transmission has an input shaft, a forward shuttle gear train, and a reverse shuttle gear train. Each shuttle gear train has a shuttle clutch selectively coupling it with the input shaft. The forward shuttle gear train drives the output shaft when the forward shuttle clutch is engaged, and the reverse shuttle gear train drives the output shaft when the reverse shuttle clutch is engaged. The at least one drive axle has at least one service brake. A hydraulic energy recapture system is coupled to the output shaft of the power-shuttle transmission and works in cooperation with the shuttle clutches and with the service brakes.

16 Claims, 10 Drawing Sheets

(51) Int. Cl.
*B60W 30/18* (2012.01)
*F16H 37/04* (2006.01)
*F15B 1/033* (2006.01)
*F15B 11/08* (2006.01)
*B60L 7/24* (2006.01)
*B60T 13/14* (2006.01)
*B60W 20/14* (2016.01)

(52) U.S. Cl.
CPC ...... *B60W 20/14* (2016.01); *B60W 30/18036* (2013.01); *B60W 30/18045* (2013.01); *B60W 30/18127* (2013.01); *F15B 1/033* (2013.01); *F15B 11/08* (2013.01); *F15B 2211/7058* (2013.01); *F16H 2037/049* (2013.01); *Y02T 10/6208* (2013.01)

(58) Field of Classification Search
CPC ........... B60W 30/14; B60W 30/18036; B60W 30/18045; B60K 6/12; B60T 13/14; B60T 13/586; F16H 2037/049; B60L 7/24
See application file for complete search history.

(56) References Cited

U.S. PATENT DOCUMENTS

| | | | |
|---|---|---|---|
| 3,770,151 A | 11/1973 | Jamison | |
| 4,243,115 A | 1/1981 | Wall et al. | |
| 4,313,351 A | 2/1982 | Hagin | |
| 4,350,220 A | 9/1982 | Carman | |
| 4,401,926 A | 8/1983 | Morton et al. | |
| 4,891,941 A * | 1/1990 | Heintz | B60K 6/12 180/165 |
| 4,986,383 A | 1/1991 | Evans | |
| 6,209,675 B1 | 4/2001 | Hayashi et al. | |
| 6,802,571 B2 | 10/2004 | Ishimaru et al. | |
| 6,971,463 B2 | 12/2005 | Shore et al. | |
| 7,100,723 B2 | 9/2006 | Roethler et al. | |
| 9,731,702 B2 * | 8/2017 | Gotz | B60W 10/02 |
| 9,926,686 B2 * | 3/2018 | Kishimoto | B60L 1/003 |
| 2006/0108860 A1 | 5/2006 | Stragier | |
| 2007/0096555 A1 | 5/2007 | Seay et al. | |
| 2010/0186408 A1 * | 7/2010 | Rose | B60K 6/12 60/629 |
| 2015/0204355 A1 * | 7/2015 | Krittian | B60K 6/12 60/596 |
| 2015/0247304 A1 | 9/2015 | Morris et al. | |
| 2017/0234338 A1 * | 8/2017 | Spielvogel | F04B 49/22 60/629 |

FOREIGN PATENT DOCUMENTS

| | | |
|---|---|---|
| WO | 02/04842 A1 | 1/2002 |
| WO | 2014/011173 A1 | 1/2014 |

* cited by examiner

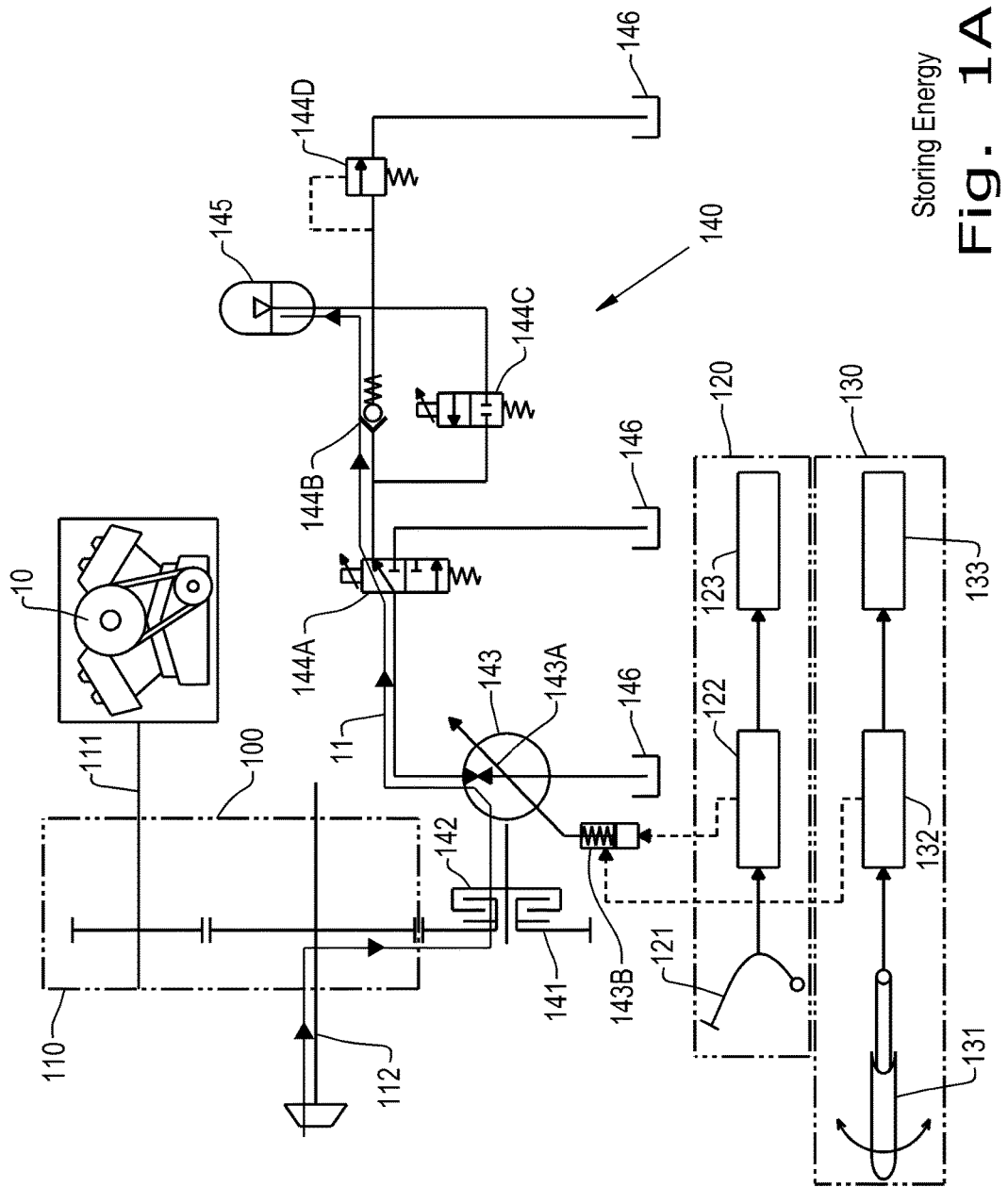

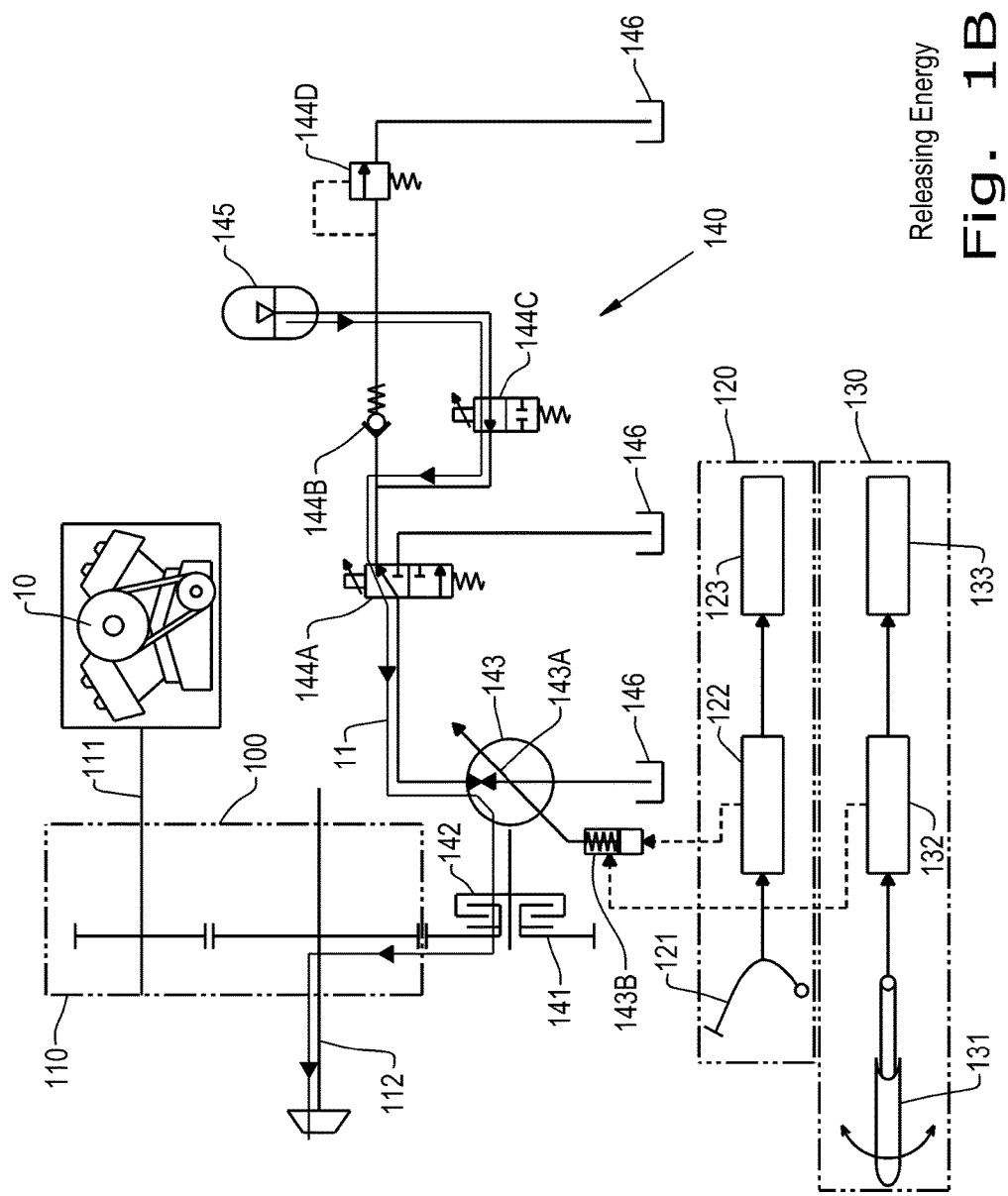
Fig. 1B  Releasing Energy

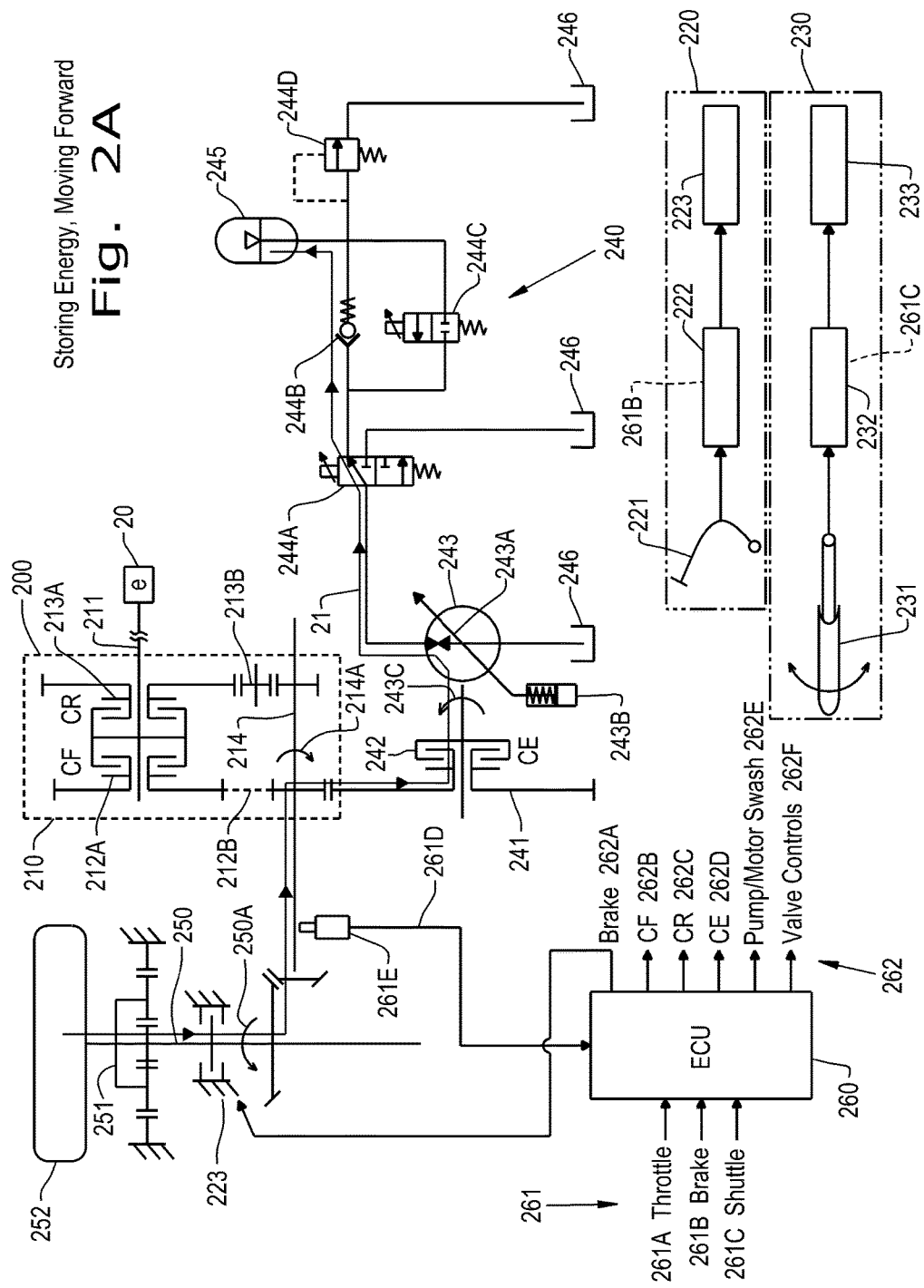

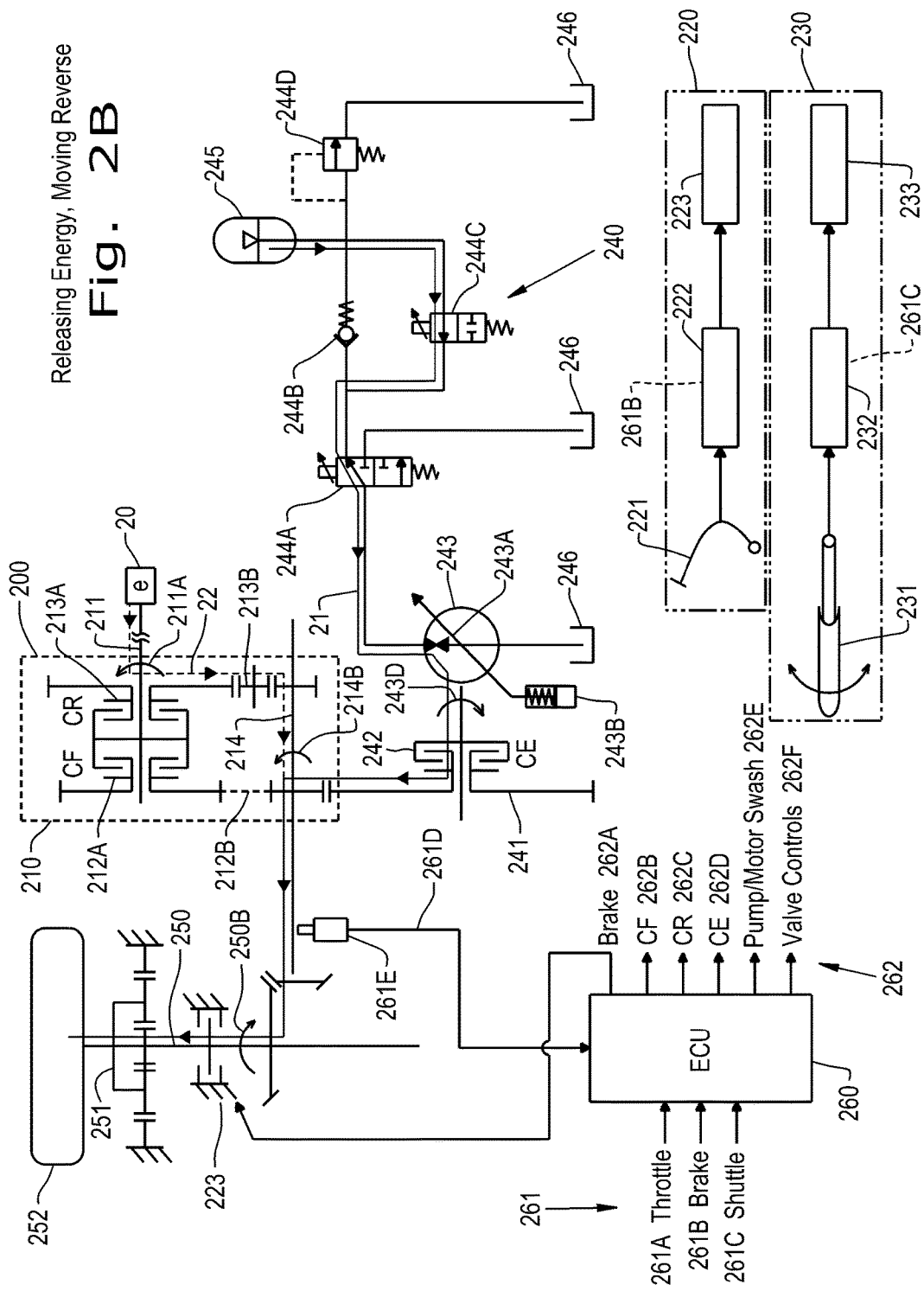
Fig. 2B  Releasing Energy, Moving Reverse

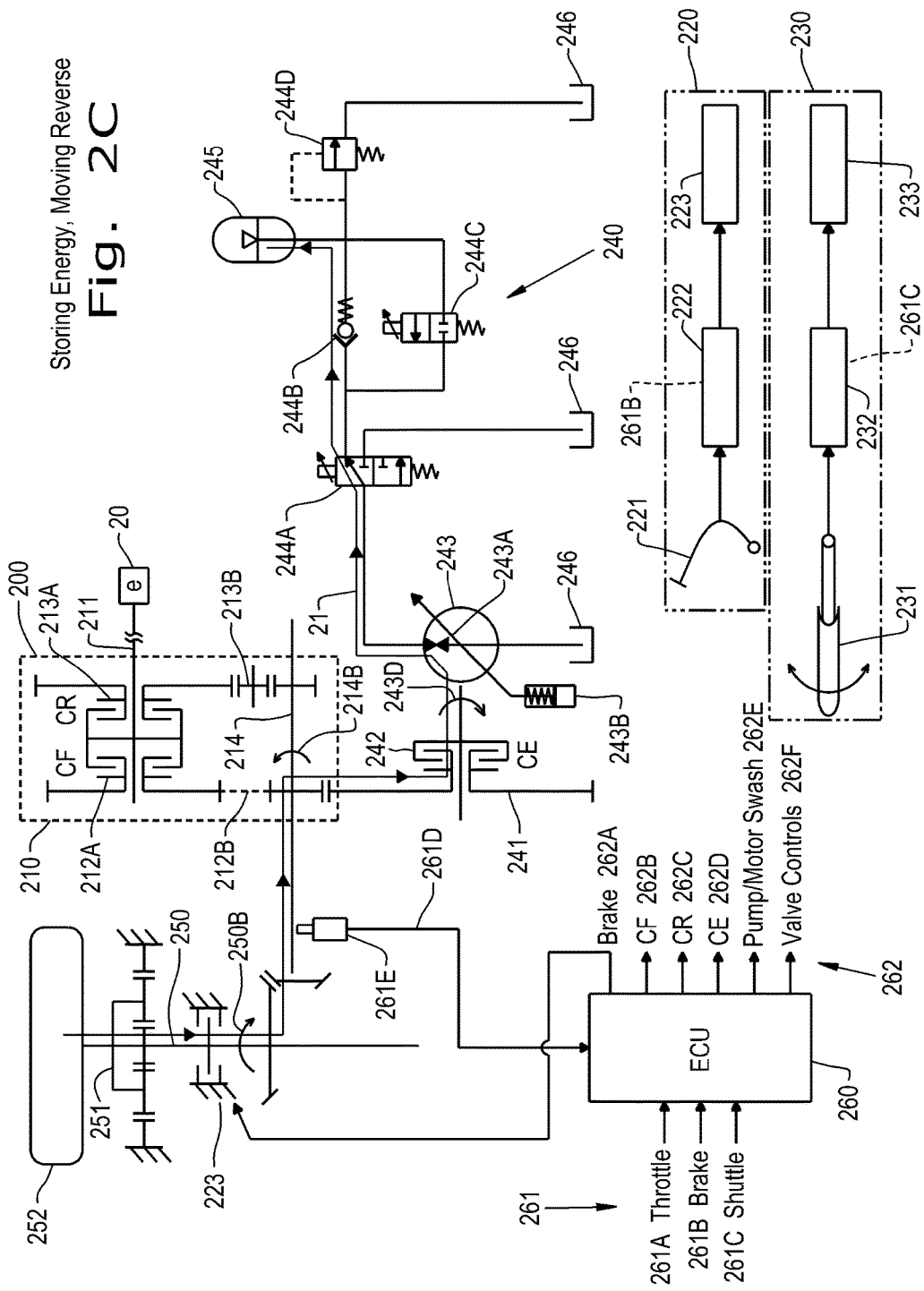

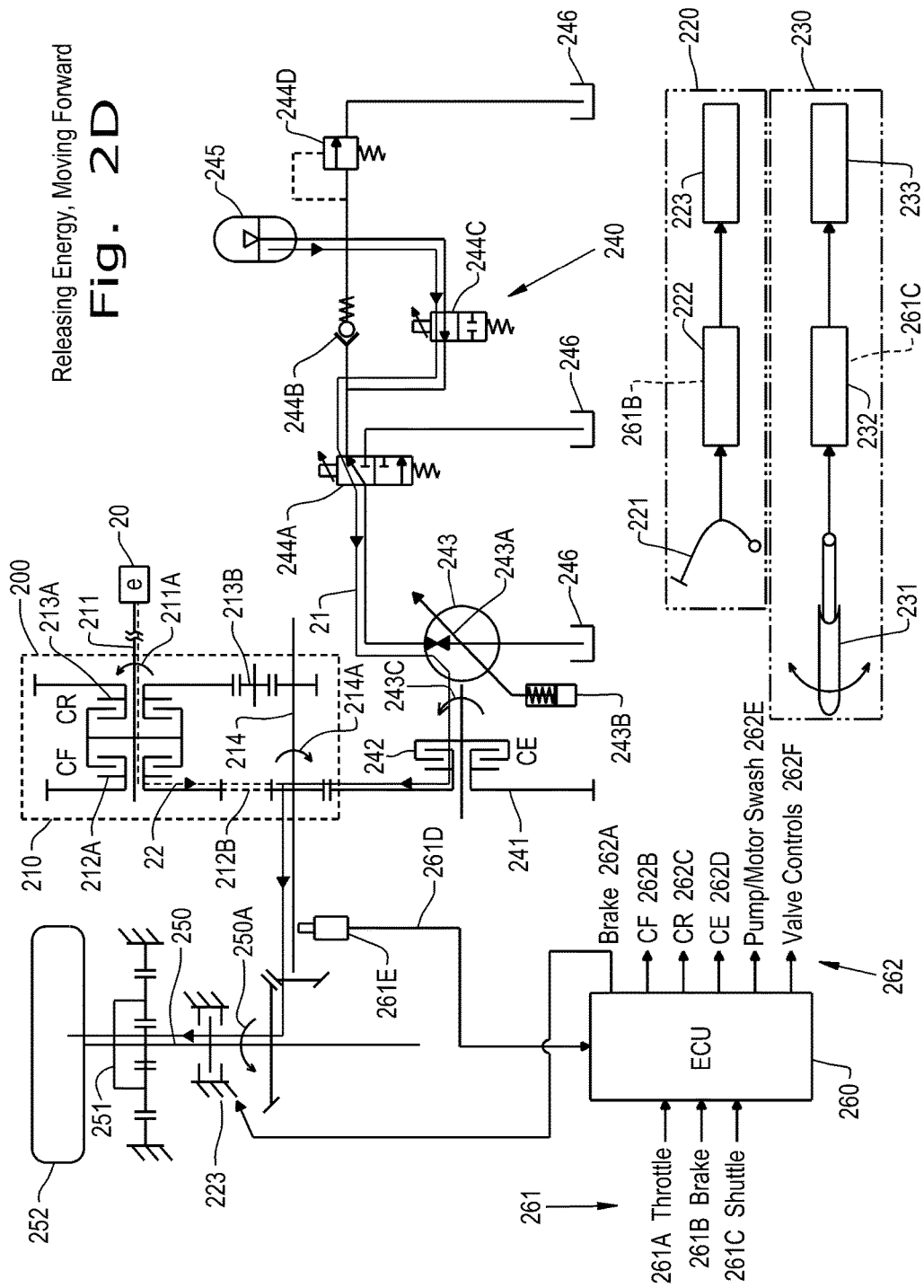

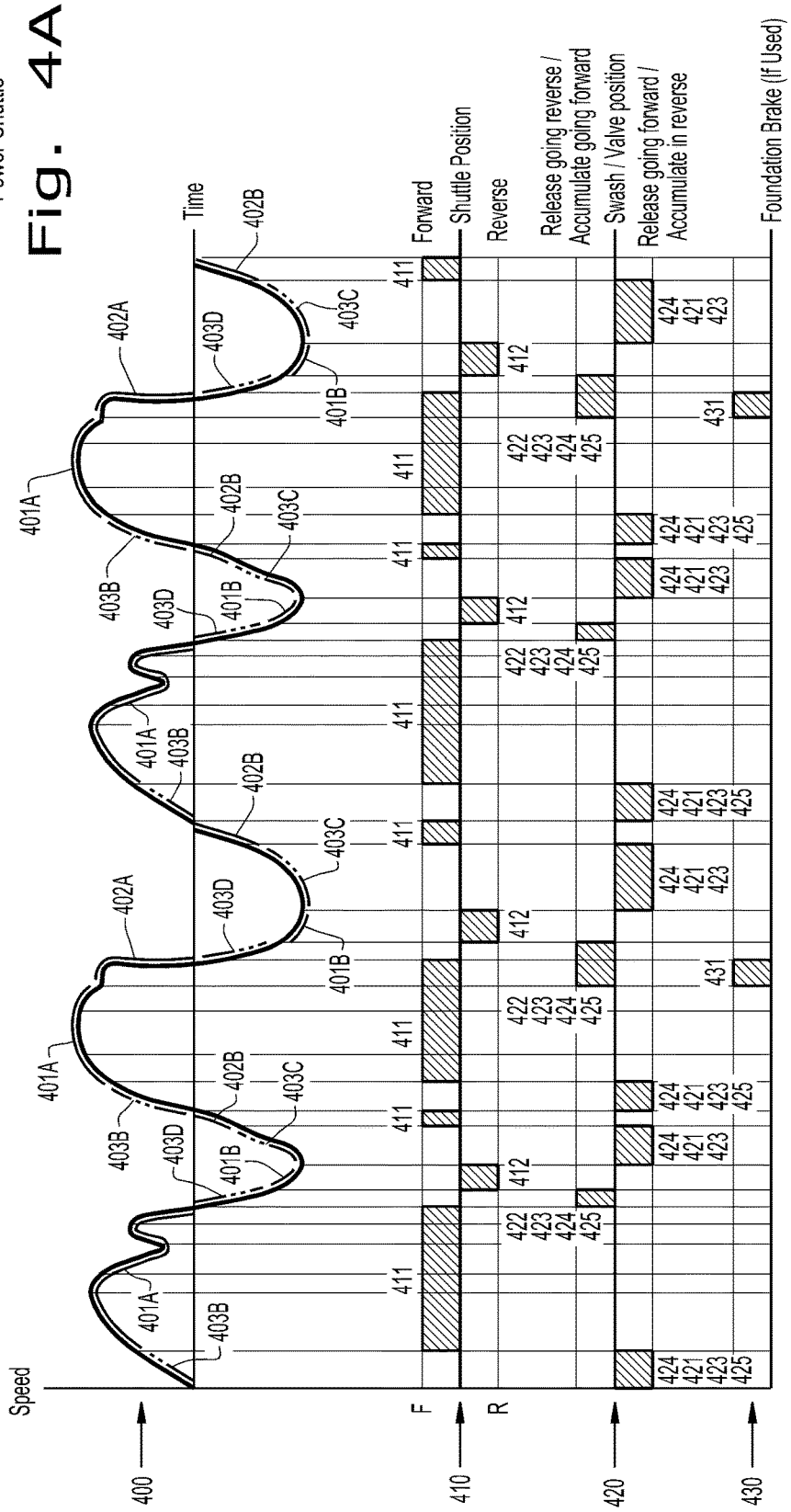

REGENERATIVE ENERGY CAPTURING AND LAUNCHING ASSISTANT

FIELD OF THE INVENTION

The present invention relates to hydraulic circuits operably connected to mechanical transmissions for construction or agricultural vehicles or machines, and, more specifically to hydraulic circuits which recover and store energy in cooperation with power-shuttle operations.

BACKGROUND OF THE INVENTION

It is well known in the art to provide transmission arrangements for agricultural, construction, or industrial vehicles or machines that allow for rapid changes in the direction of movement of the vehicles or machines. This allows such vehicles or machines that must repeatedly change travel direction to do so without extensive braking and gear changes by the operator. As an example, a loader loading a dump truck must accelerate forward into a pile in order to fill its loader bucket, then reverse out of the pile, move forward to the dump truck, reverse away from the dump truck, and then accelerate again toward the pile. This cycle may be repeated several times for each loading event. Using a conventional geared transmission and service brakes, each cycle may involve four or more applications of the service brakes, four or more depressions of the clutch, and four or more gear changes, all while attending to the operation of the loader bucket and to the surrounding environment.

To minimize the amount of necessary coordination, a known type of transmission arrangement for agricultural, construction, or industrial vehicles or machines that allow for rapid changes in the direction of movement is a power-shuttle transmission. This type of transmission has two separate clutches that are typically operated with a single lever. One clutch engages a forward gear train, and the other clutch engages a reverse gear train. When transitioning from forward to reverse, or vice versa, the operator needs only move the shuttle lever from one direction to the other. In response, one clutch disengages and the other engages. The engaging clutch operates to absorb the inertia or kinetic energy of the vehicle, acting essentially as a brake until the vehicle reaches zero velocity, before further operating to engage its gear train to cause the vehicle to move in the other direction.

Constant use of the power-shuttle transmission clutches to not only engage opposing direction gear trains, but also to absorb the inertia or kinetic energy of the heavy moving vehicle or machine, often results in a large amount of wear and stress on the clutches, so that the clutches must be greatly overdesigned. Furthermore, even in an overdesigned condition, the repeated engagement of the power-shuttle transmission clutches against the inertia of the heavy moving vehicle or machine generates a tremendous amount of heat, which must be removed from the transmission and dissipated to the surrounding environment. Additionally, as the inertia or kinetic energy of the moving vehicle or machine must be absorbed against the force of the vehicle engine, use of the conventional power-shuttle transmission results in higher fuel usage and accompanying costs, as well as increased vehicle or machine tailpipe emissions.

What is needed in the art, therefore, is a way to take advantage of the power and convenience of a power-shuttle transmission, while minimizing the amount of wear and tear experienced by the shuttle clutches and/or wear experienced by the service brakes, and further minimizing the heat load generated within the power-shuttle transmission.

SUMMARY OF THE INVENTION

Embodiments of the present invention are implemented on agricultural, construction, or industrial vehicles or machine having a power-shuttle transmission and provide such a way to take advantage of the capabilities of the power-shuttle transmission while minimizing wear of the shuttle clutches and/or on the service brakes, and minimizing the amount of kinetic energy that is converted to heat. Embodiments of the present invention allow for more efficiently designed power-shuttle transmission clutches, while minimizing fuel usage and cost, and while minimizing vehicle or machine or tailpipe emissions.

Embodiments of the present invention accomplish this by capturing vehicle or machine kinetic energy during braking and/or shuttle clutch operation, storing the kinetic energy as potential energy as hydraulic fluid under pressure in a pressurized hydraulic accumulator, and releasing it again upon demand for acceleration of the vehicle or machine. In at least one embodiment of the present invention, this is done by way of a hydraulic unit, which may be a variable displacement hydraulic pump/motor that is connected to the output shaft of the power-shuttle transmission through a drive gear and hydraulic unit clutch. The variable displacement hydraulic pump/motor connected to the output shaft of the power-shuttle transmission through a drive gear and a hydraulic unit clutch may further be a bidirectional variable displacement hydraulic pump/motor. When the vehicle or machine is decelerating, instead of exclusively using the service brake and/or the shuttle clutches to decelerate the vehicle or machine, the hydraulic unit clutch engages, driving the hydraulic unit from the output shaft of the power-shuttle transmission.

In the embodiment of the variable displacement hydraulic pump/motor or of the bidirectional variable displacement hydraulic pump/motor, the swashplate of the pump/motor is set according to the direction of rotation of the output shaft of the power-shuttle transmission in order to pump hydraulic fluid into the pressurized hydraulic accumulator. The pumping of hydraulic fluid by the variable displacement hydraulic pump/motor or bidirectional variable displacement hydraulic pump/motor against the pressure of the pressurized hydraulic accumulator acts to decelerate the vehicle or machine, while storing kinetic energy in the form of hydraulic fluid under pressure in the pressurized hydraulic accumulator. The hydraulic accumulator itself may be any vessel that is capable of storing a variable volume of hydraulic fluid under high pressure. The pressure may be provided by an adjoining chamber of pressurized gas separated by a diaphragm, or by a piston actuated by a spring, as non-limiting examples.

Thereafter, when the operator desires the vehicle or machine to accelerate, the swashplate of the hydraulic pump/motor is set according to the desired direction of rotation of the output shaft of the power-shuttle transmission, and hydraulic fluid under pressure is released from the pressurized hydraulic accumulator, thereby driving the hydraulic pump/motor. Power from the hydraulic pump/motor then passes back to the driveline of the vehicle or machine by way of the hydraulic unit clutch and thereby accelerates the vehicle or machine in the desired direction. In at least one embodiment of the present invention, a individual control unit or Engine Control Unit (ECU), which may further be an electronic control unit, may control this hydraulic energy recapture system and coordinate it with the vehicle or machine engine, the power-shuttle transmission, and the vehicle or machine service brakes, according to the commands of the vehicle or machine throttle, brake pedal, and shuttle lever.

In one embodiment of the present invention, use of the hydraulic energy recapture system and of the engine, power-shuttle transmission, and/or vehicle or machine service brakes may essentially be sequential. For example, under certain operating conditions, upon movement of the shuttle lever from forward to reverse when travelling in a forward direction, the individual control unit or ECU first causes the service brake to briefly apply and/or the reverse shuttle clutch to briefly slidingly engage while engaging the hydraulic unit clutch, configuring the swashplate, activating hydraulic valves, and causing the hydraulic unit to commence pumping and building pressure in the pressurized hydraulic accumulator. Second, once a minimum amount of back-pressure has built up in the pressurized hydraulic accumulator, the individual control unit or ECU releases the service brake and/or disengages the shuttle clutch, while the hydraulic unit pumps hydraulic fluid against the pressure of the pressurized hydraulic accumulator, thereby slowing the vehicle or machine at the commanded rate and storing the vehicle kinetic energy as potential energy within the pressurized hydraulic accumulator. This continues until the vehicle or machine comes to zero velocity, or until the maximum storage capacity of the pressurized hydraulic accumulator is reached, in which case the individual control unit or ECU reengages the service brake and/or again slidingly engages the reverse shuttle clutch to finish bringing the vehicle or machine to a stop.

Third, the individual control unit or ECU configures the hydraulic unit to act as a motor in the reverse direction and releases the stored hydraulic potential energy from the pressurized hydraulic accumulator to drive the hydraulic unit, thereby accelerating the vehicle or machine in the reverse direction and converting the stored potential energy back to kinetic energy in the reverse direction. Upon exhaustion of the stored hydraulic potential energy in the pressurized hydraulic accumulator, the individual control unit or ECU causes the reverse shuttle clutch to reengage, and accelerates the vehicle or machine to the desired velocity in reverse using the engine. When the hydraulic unit is not acting as a pump to decelerate the vehicle or machine, or as a motor to accelerate the vehicle or machine, the hydraulic unit clutch may be disengaged, the swashplate may be set to zero displacement, and/or the pressurized hydraulic accumulator may be isolated using valves.

Alternately, when the hydraulic unit is not acting as a pump to decelerate the vehicle or machine, or as a motor to accelerate the vehicle or machine, the clutch may be disengaged and the swashplate may be set to zero displacement without otherwise isolating the pressurized hydraulic accumulator using valves. Still alternately, when the hydraulic unit is not acting as a pump to decelerate the vehicle or machine, or as a motor to accelerate the vehicle or machine, a one way valve may be used to isolate the pressurized hydraulic accumulator from the remainder of the hydraulic energy recapture system, a separate two way valve may return any hydraulic pressure and flow from the hydraulic unit to a reservoir, or both the one way valve may be used to isolate the pressurized hydraulic accumulator from the remainder of the hydraulic energy recapture system and the separate two way valve may return any hydraulic pressure and flow from the hydraulic unit to a reservoir.

Moving the shuttle lever from reverse to forward when travelling in a reverse direction under certain operating conditions simply reverses this process. The individual control unit or ECU first causes the service brake and/or forward shuttle clutch to briefly slidingly engage while engaging the hydraulic unit clutch, configuring the swashplate, and causing the hydraulic unit to commence pumping to build pressure in the pressurized hydraulic accumulator. Second, when the hydraulic unit and pressurized hydraulic accumulator are ready and a minimum amount of back-pressure has built up, the individual control unit or ECU releases the service brake and/or disengages the shuttle clutch. The hydraulic unit again pumps hydraulic fluid against the pressure of the pressurized hydraulic accumulator, thereby slowing the vehicle or machine and storing the vehicle kinetic energy as potential energy within the pressurized hydraulic accumulator. Once the vehicle or machine comes to zero velocity, either solely by conversion of kinetic energy to stored potential energy, or by application of the service brake and/or slidingly engaging the forward shuttle clutch upon the pressurized hydraulic accumulator reaching its maximum storage capacity, the individual control unit or ECU then configures the hydraulic unit to act as a motor in the forward direction.

The individual control unit or ECU then releases the stored hydraulic potential energy by orienting the valves of the hydraulic energy recapture system to place the pressurized hydraulic accumulator in fluid communication with the hydraulic unit, now acting as a motor in the forward direction. This accelerates the vehicle or machine in the forward direction and converts the stored potential energy back to kinetic energy in the forward direction. Again, upon exhaustion of the stored hydraulic potential energy in the pressurized hydraulic accumulator, the individual control unit or ECU causes the forward shuttle clutch to reengage, and accelerates the vehicle or machine to the desired velocity in the forward direction using the engine. As before, when the hydraulic unit is not acting as a pump to decelerate the vehicle or machine, or as a motor to accelerate the vehicle or machine, the hydraulic unit clutch may be disengaged, the swashplate may be set to zero displacement, and/or the pressurized hydraulic accumulator may be isolated using valves, or the clutch may be disengaged and the swashplate may be set to zero displacement without otherwise isolating the pressurized hydraulic accumulator using valves. Still alternately, when the hydraulic unit is not acting as a pump to decelerate the vehicle or machine, or as a motor to accelerate the vehicle or machine, a one way valve may be used to isolate the pressurized hydraulic accumulator from the remainder of the hydraulic energy recapture system, a separate two way valve may return any hydraulic pressure and flow from the hydraulic unit to a reservoir, or both the one way valve may be used to isolate the pressurized hydraulic accumulator from the remainder of the hydraulic energy recapture system and the separate two way valve may return any hydraulic pressure and flow from the hydraulic unit to a reservoir.

In another embodiment of the present invention, use of the hydraulic energy recapture system and of the engine, power-shuttle transmission, and/or vehicle or machine service brakes may essentially be simultaneous. Simultaneous use of the hydraulic energy recapture system and of the engine, power-shuttle transmission, and/or vehicle or machine service brakes may be used to produce boosted acceleration and/or deceleration of the vehicle or machine. For example, upon movement of the shuttle lever from forward to reverse when travelling in a forward direction, the individual control unit or ECU first causes the service brake and/or reverse shuttle clutch to slidingly engage while engaging the hydraulic unit clutch, configuring the swashplate, and causing the hydraulic unit to commence pumping and building pressure in the pressurized hydraulic accumulator. Second, once the minimum amount of back-pressure has built up in the pressurized hydraulic accumulator, the individual control unit or ECU may fully release the service brake and/or fully disengage the reverse shuttle clutch, or may only partially release the service brake and/or reduce engagement pressure of the reverse shuttle clutch, depending for example upon the amount of storage capacity available in the pressurized hydraulic accumulator and upon the forward velocity of the vehicle or machine.

The hydraulic unit again pumps hydraulic fluid against the pressure of the pressurized hydraulic accumulator, thereby slowing the vehicle or machine at the commanded rate and storing the vehicle kinetic energy as potential energy within the pressurized hydraulic accumulator. If the service brake is only partially released and/or the reverse shuttle clutch engagement pressure is reduced, then slowing the vehicle or machine at the commanded rate is accomplished jointly by the hydraulic energy recapture system and by the service brake and/or shuttle clutch. Even in the simultaneous embodiment of the present invention, the hydraulic energy recapture system may rely to a greater amount on the hydraulic unit and pressurized hydraulic accumulator to slow the vehicle, in order to take full advantage of the capacity of the pressurized hydraulic accumulator.

Once the vehicle or machine comes to zero velocity, or the maximum storage capacity of the pressurized hydraulic accumulator is reached and/or the service brake and/or reverse shuttle clutch is used to bring the vehicle or machine to a stop, the individual control unit or ECU configures the hydraulic unit to act as a motor in the reverse direction. The individual control unit or ECU then causes the reverse shuttle clutch to reengage, or reengage at a reduced engagement pressure, and also releases the stored hydraulic potential energy from the pressurized hydraulic accumulator to drive the hydraulic unit. The hydraulic unit and the reverse shuttle clutch of the power-shuttle transmission then jointly accelerate the vehicle or machine in the reverse direction, the power-shuttle transmission utilizing energy provided by the engine, and the hydraulic unit converting stored potential energy back to kinetic energy in the reverse direction. Again, when the hydraulic unit is not acting as a pump to decelerate the vehicle or machine, or as a motor to accelerate the vehicle or machine, the hydraulic unit clutch may be disengaged, the swashplate may be set to zero displacement, and/or the pressurized hydraulic accumulator may be isolated using valves.

Alternately, when the hydraulic unit is not acting as a pump to decelerate the vehicle or machine, or as a motor to accelerate the vehicle or machine, the clutch may be disengaged and the swashplate may be set to zero displacement without otherwise isolating the pressurized hydraulic accumulator using valves. Still alternately, when the hydraulic unit is not acting as a pump to decelerate the vehicle or machine, or as a motor to accelerate the vehicle or machine, a one way valve may be used to isolate the pressurized hydraulic accumulator from the remainder of the hydraulic energy recapture system, a separate two way valve may return any hydraulic pressure and flow from the hydraulic unit to a reservoir, or both the one way valve may be used to isolate the pressurized hydraulic accumulator from the remainder of the hydraulic energy recapture system and the separate two way valve may return any hydraulic pressure and flow from the hydraulic unit to a reservoir.

In the embodiment of the present invention wherein use of the hydraulic energy recapture system and of the engine, power-shuttle transmission, and/or vehicle or machine service brakes is essentially simultaneous, moving the shuttle lever from reverse to forward when travelling in the reverse direction again simply reverses the process. The individual control unit or ECU under certain conditions first causes the service brake and/or forward shuttle clutch to slidingly engage while engaging the hydraulic unit clutch, configuring the swashplate, and causing the hydraulic unit to commence pumping and building pressure in the pressurized hydraulic accumulator. Second, once the minimum amount of back-pressure has built up in the pressurized hydraulic accumulator, the individual control unit or ECU may again fully release the service brake and/or fully disengage the forward shuttle clutch, or may partially release the service brake and/or reduce the engagement pressure of the forward shuttle clutch, depending for example upon the amount of storage capacity available in the pressurized hydraulic accumulator and upon the reverse velocity of the vehicle or machine.

The hydraulic unit again pumps hydraulic fluid against the pressure of the pressurized hydraulic accumulator, thereby slowing the vehicle or machine at the commanded rate and storing the vehicle kinetic energy as potential energy within the pressurized hydraulic accumulator. If the service brake is only partially released and/or the forward shuttle clutch engagement pressure is reduced, then slowing the vehicle or machine at the commanded rate is accomplished jointly by the hydraulic energy recapture system and by the service brake and/or shuttle clutch. Again, the hydraulic energy recapture system may rely to a greater amount on the hydraulic unit and pressurized hydraulic accumulator to slow the vehicle, in order to take full advantage of the capacity of the pressurized hydraulic accumulator.

Once the vehicle or machine comes to zero velocity, or the maximum storage capacity of the pressurized hydraulic accumulator is reached and the service brake and/or forward shuttle clutch is used to bring the vehicle or machine to a stop, the individual control unit or ECU configures the hydraulic unit to act as a motor in the forward direction. The individual control unit or ECU then causes the forward shuttle clutch to reengage, or reengage at a reduced engagement pressure, and also releases the stored hydraulic potential energy from the pressurized hydraulic accumulator to drive the hydraulic unit. The hydraulic unit and the forward shuttle clutch of the power-shuttle transmission then jointly accelerate the vehicle or machine in the forward direction, the power-shuttle transmission utilizing energy provided by the engine, and the hydraulic unit converting stored potential energy back to kinetic energy in the forward direction. As before, when the hydraulic unit is not acting as a pump to decelerate the vehicle or machine, or as a motor to accelerate the vehicle or machine, the hydraulic unit clutch may be disengaged, the swashplate may be set to zero displacement, and/or the pressurized hydraulic accumulator may be isolated using valves, or the clutch may be disengaged and the swashplate may be set to zero displacement without otherwise isolating the pressurized hydraulic accumulator using valves. Still alternately, when the hydraulic unit is not acting as a pump to decelerate the vehicle or machine, or as a motor to accelerate the vehicle or machine, a one way valve may be used to isolate the pressurized hydraulic accumulator from the remainder of the hydraulic energy recapture system, a separate two way valve may return any hydraulic pressure and flow from the hydraulic unit to a reservoir, or both the one way valve may be used to isolate the pressurized hydraulic accumulator from the remainder of the hydraulic energy recapture system and the separate two way valve may return any hydraulic pressure and flow from the hydraulic unit to a reservoir.

In either embodiment of the present invention, that wherein use of the hydraulic energy recapture system and of the engine, power-shuttle transmission, and/or vehicle or machine service brakes is essentially sequential, or that wherein use of the hydraulic energy recapture system and of the engine, power-shuttle transmission, and/or vehicle or machine service brakes is essentially simultaneous, by minimizing the duration of sliding engagement of the shuttle clutches and/or by minimizing the amount of energy that must be absorbed or delivered by the shuttle clutches when in sliding engagement, the useful life of the shuttle clutch plates is maximized and fuel usage and tailpipe emissions is minimized. Similarly, by minimizing the duration of application of the service brakes and minimizing the amount of energy that must be absorbed by the service brakes when applied, in an embodiment wherein the service brakes are used, the useful life of the service brakes is maximized. Furthermore, embodiments of the present invention may use both sequential and simultaneous application of the hydraulic energy recapture system and of the engine, power-shuttle transmission, and/or vehicle or machine service brakes, according to operating conditions.

Embodiments of the present invention have demonstrated that a large percentage of vehicle or machine kinetic energy can be recaptured using the hydraulic unit and pressurized hydraulic accumulator. For example, an embodiment of the present invention implemented on a loader loading a dump truck has been simulated undergoing one braking every 20 to 30 second operating cycle. Results of the simulation show that over 99% of the vehicle or machine kinetic energy may successfully be captured as potential energy. Further testing indicates that a typical braking cycle is able to charge a 3.8 liter pressurized hydraulic accumulator to 350 bars of pressure. One and a half to two brakings may be required under low braking efforts in order to charge the pressurized hydraulic accumulator.

In accordance with one aspect of the present invention, there is provided an agricultural, construction, or industrial vehicle or machine having a driveline. The driveline includes an engine, a power-shuttle transmission connected to the engine, and at least one drive axle driven by an output shaft of the power-shuttle transmission. The power-shuttle transmission has an input shaft, a forward shuttle gear train, and a reverse shuttle gear train in parallel with the forward shuttle gear train. The forward shuttle gear train has a forward shuttle clutch selectively coupling the forward shuttle gear train with the input shaft. The reverse shuttle gear train has a reverse shuttle clutch selectively coupling the reverse shuttle gear train with the input shaft. The forward shuttle gear train drives the output shaft when the forward shuttle clutch is engaged, and the reverse shuttle gear train drives the output shaft when the reverse shuttle clutch is engaged. The at least one drive axle has at least one service brake. An energy recapture system is coupled to the output shaft of the power-shuttle transmission.

In accordance with another aspect of the present invention, there is provided a hydraulic energy recapture system of an agricultural, construction, or industrial vehicle or machine having an engine, a driveline, and at least one axle having at least one service brake. The hydraulic energy recapture system includes a power-shuttle transmission connected to the engine. The power-shuttle transmission has an input shaft and an output shaft. The power-shuttle transmission also has a forward shuttle gear train, and a reverse shuttle gear train in parallel with the forward shuttle gear train. The forward shuttle gear train has a forward shuttle clutch selectively coupling the forward shuttle gear train with the input shaft. The reverse shuttle gear train has a reverse shuttle clutch selectively coupling the reverse shuttle gear train with the input shaft. The forward shuttle gear train drives the output shaft when the forward shuttle clutch is engaged, and the reverse shuttle gear train drives the output shaft when the reverse shuttle clutch is engaged. The output shaft of the power-shuttle transmission drives the at least one drive axle. A hydraulic unit is coupled with the output shaft of the power-shuttle transmission. The hydraulic unit is operable to convert rotational power to hydraulic pressure and flow, and to convert hydraulic pressure and flow to rotational power. A pressurized hydraulic accumulator is in hydraulic communication with the hydraulic unit, and is operable to store hydraulic fluid under pressure.

In accordance with yet another aspect of the present invention, there is provided a method of storing kinetic energy of an agricultural, construction, or industrial vehicle or machine as potential energy, and of releasing the potential energy as kinetic energy of the agricultural, construction, or industrial vehicle or machine. The agricultural, construction, or industrial vehicle or machine has an engine, a driveline, and at least one axle having at least one service brake. The method includes several steps. The first step is connecting a power-shuttle transmission to the engine. The power-shuttle transmission has an input shaft and an output shaft. The power-shuttle transmission also has a forward shuttle gear train, and a reverse shuttle gear train in parallel with the forward shuttle gear train. The forward shuttle gear train has a forward shuttle clutch selectively coupling the forward shuttle gear train with the input shaft. The reverse shuttle gear train has a reverse shuttle clutch selectively coupling the reverse shuttle gear train with the input shaft. The forward shuttle gear train drives the output shaft when the forward shuttle clutch is engaged, and the reverse shuttle gear train drives the output shaft when the reverse shuttle clutch is engaged. The second step is driving the at least one drive axle using the output shaft of the power-shuttle transmission. The third step is coupling a hydraulic unit by way of a hydraulic unit clutch with the output shaft of the power-shuttle transmission. The hydraulic unit is operable to convert rotational power to hydraulic pressure and flow, and to convert hydraulic pressure and flow to rotational power. The fourth step is placing a pressurized hydraulic accumulator operable to store hydraulic fluid under pressure in hydraulic communication with the hydraulic unit.

An advantage of the hydraulic energy recapture system described herein is that, by converting kinetic energy of the agricultural, construction or industrial vehicle or machine into potential energy stored in a hydraulic accumulator or other energy recapture device, and restoring the potential energy stored in the hydraulic accumulator or other energy recapture device to kinetic energy of the agricultural, construction, or industrial vehicle or machine, less overall power is required from the vehicle or machine engine. This results in fuel savings, lowered tailpipe emissions, reduced wear of the shuttle clutches and of the service brakes, and decreased heat generation.

Another advantage of the hydraulic energy recapture system described herein is that productivity is improved. Agricultural, construction, and industrial vehicles and machines are foremost revenue producing equipment. By decreasing the time and energy spent accelerating and decelerating the vehicle or equipment, thereby reducing operation cycle times, the amount of productive work that can be obtained from the vehicle or machine and its operator may be increased.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1A is a partial schematic of a hydraulic energy recapture system, in accordance with an exemplary embodiment of the present invention;

FIG. 1B is a partial schematic of a hydraulic energy recapture system, in accordance with an exemplary embodiment of the present invention;

FIG. 2A is a detailed schematic of a hydraulic energy recapture system, in accordance with an exemplary embodiment of the present invention;

FIG. 2B is a detailed schematic of a hydraulic energy recapture system, in accordance with an exemplary embodiment of the present invention;

FIG. 2C is a detailed schematic of a hydraulic energy recapture system, in accordance with an exemplary embodiment of the present invention;

FIG. 2D is a detailed schematic of a hydraulic energy recapture system, in accordance with an exemplary embodiment of the present invention;

FIG. 4A is a set of charts on a common vertical axis, including vehicle speed, shuttle clutch position, hydraulic unit swashplate position, and service brake position, in accordance with an exemplary embodiment of the present invention;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 3:
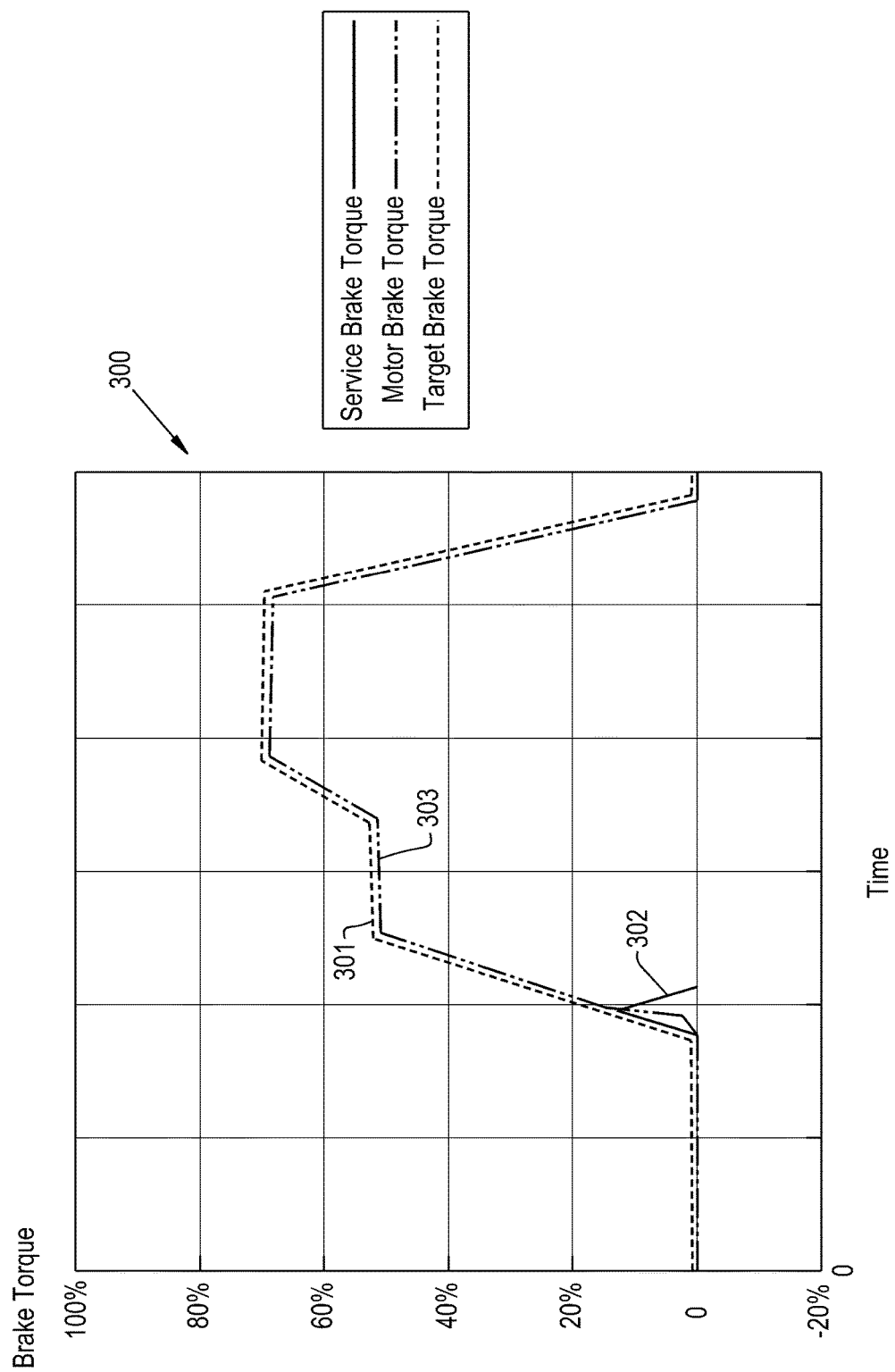
FIG. 3 is a chart of brake torque, in accordance with an exemplary embodiment of the present invention.

The terms "hydraulic," "motor," "pump," "valve," "lever," "pedal," "clutch," and "wheels" are used principally throughout this specification for convenience but it is to be understood that these terms are not intended to be limiting. Thus "hydraulic" refers to any incompressible fluid. "Motor" refers to any device that converts stored potential energy to kinetic energy. "Valve" refers to any device that is capable of selectively interrupting and/or redirecting fluid flow. "Lever" and "pedal" both refer to any device that receives operator input and to be translated into vehicle commands. "Clutch" refers to any device that selectively couples rotating members. "Wheels" refers to any ground running device, and may include endless tracks, as a non-limiting example. Also the terms "forward", "rearward", "left" and "right", when used in connection with the agricultural, construction or industrial vehicle or machine and/or components thereof are usually determined with reference to the direction of forward operative travel of the vehicle or machine, but again, they should not be construed as limiting. The terms "longitudinal" and "transverse" are determined with reference to the fore-and-aft direction of the agricultural, construction, or industrial vehicle or machine and are equally not to be construed as limiting.

Referring now to the drawings, and more particularly to FIGS. 1A and 1B, there is shown a partial schematic of an exemplary embodiment of the present invention, being a hydraulic energy recapture system 140. An engine 10 is connected to a transmission input shaft 111, which transmits power from the engine 10 to a transmission 110. Transmission 110 may further be a power-shuttle transmission, further details of which will be shown in subsequent figures. The transmission 110 is part of the driveline 100 of an agricultural, industrial, or construction vehicle or machine, and has a transmission output shaft 112, which provides power to drive the agricultural, industrial, or construction vehicle or machine (not shown).

A hydraulic unit drive gear 141 is geared to the transmission output shaft 112, and selectively transmits power to and from a hydraulic unit 143 by way of a hydraulic unit clutch 142. The hydraulic unit 143 may further be embodied as a variable displacement hydraulic pump/motor or as a bidirectional variable displacement hydraulic pump/motor, and may be provided with a hydraulic unit swashplate 143A, which is positioned by a hydraulic unit swashplate controller 143B, thereby varying the hydraulic pumping displacement of the hydraulic unit 143. The hydraulic unit 143 is capable of functioning as a variable displacement hydraulic pump, thereby storing vehicle or machine kinetic energy as potential energy by pumping hydraulic fluid into a pressurized hydraulic accumulator 145. The hydraulic unit 143 is further capable as functioning as a variable displacement hydraulic motor, thereby converting potential energy stored in the pressurized hydraulic accumulator 145 to vehicle or machine kinetic energy.

When the hydraulic energy recapture system 140 is being used to convert kinetic energy of the agricultural, industrial, or construction vehicle or machine to potential energy stored in a pressurized hydraulic accumulator 145, as shown in FIG. 1A, the hydraulic unit swashplate 143A of the hydraulic unit 143 is positioned by the hydraulic unit swashplate controller 143B according to the direction of movement of the agricultural, industrial, or construction vehicle or machine so that the hydraulic unit 143 pumps hydraulic fluid from a reservoir 146 to the pressurized hydraulic accumulator 145, which stores the hydraulic fluid under high pressure. To enable hydraulic communication between the hydraulic unit 143 and the pressurized hydraulic accumulator 145, the hydraulic energy recapture system 140 is arranged so that first two way valve 144A is activated, directing the hydraulic fluid through check valve 144B to the pressurized hydraulic accumulator 145. Second one way valve 144C remains inactive and closed, and pressure relief valve 144D provides pressure relief protection for the hydraulic unit 143 and the pressurized hydraulic accumulator 145.

In this way, the direction of hydraulic energy recapture system power flow 11 is from the driveline 100 by way of the transmission output shaft 112, through the hydraulic unit drive gear 141, through the hydraulic unit clutch 142, through the hydraulic unit 143 of the hydraulic energy recapture system 140 to the pressurized hydraulic accumulator 145 by way of the first two way valve 144A and the check valve 144B. Alternately, no first two way valve 144A may be provided, so that hydraulic communication is enabled between the hydraulic unit 143 and the pressurized hydraulic accumulator 145 directly through check valve 144B. In this case, the direction of hydraulic energy recapture system power flow 11 is from the driveline 100 by way of the transmission output shaft 112, through the hydraulic unit drive gear 141, through the hydraulic unit clutch 142, through the hydraulic unit 143 of the hydraulic energy recapture system 140 to the pressurized hydraulic accumulator 145 by way of the check valve 144B only.

When the hydraulic energy recapture system 140 is being used to convert potential energy stored in the pressurized hydraulic accumulator 145 to kinetic energy of the agricultural, industrial, or construction vehicle or machine, as shown in FIG. 1B, the hydraulic unit swashplate 143A of the hydraulic unit 143 is positioned by the hydraulic unit swashplate controller 143B according to the desired direction of movement of the agricultural, industrial, or construction vehicle or machine so that the hydraulic unit 143 receives pressurized hydraulic fluid from the pressurized hydraulic accumulator 145, and acts as a hydraulic motor. To enable hydraulic communication between the pressurized hydraulic accumulator 145 and the hydraulic unit 143, the hydraulic energy recapture system 140 is arranged so that the second one way valve 144C is activated, directing the hydraulic fluid through the first two way valve 144A, which is also activated, to the hydraulic unit 143, which then operates as a hydraulic motor.

In this way, the direction of hydraulic energy recapture system power flow 11 is from the pressurized hydraulic accumulator 145 by way of the second one way valve 144C and the first two way valve 144A to the hydraulic unit 143 of the hydraulic energy recapture system 140, through the hydraulic unit clutch 142 and through the hydraulic unit drive gear 141 to the transmission output shaft 112 of the driveline 100. Alternately, no first two way valve 144A may be provided, so that hydraulic communication is enabled between the pressurized hydraulic accumulator 145 and the hydraulic unit 143 directly through second one way valve 144C. In this case, the direction of hydraulic energy recapture system power flow 11 is from the pressurized hydraulic accumulator 145 by way of the second one way valve 144C to the hydraulic unit 143 of the hydraulic energy recapture system 140, through the hydraulic unit clutch 142 and through the hydraulic unit drive gear 141 to the transmission output shaft 112 of the driveline 100.

When the hydraulic energy recapture system 140 is not being used either to convert kinetic energy of the agricultural, industrial, or construction vehicle or machine to potential energy in the pressurized hydraulic accumulator 145, or to convert potential energy stored in the pressurized hydraulic accumulator 145 to kinetic energy of the agricultural, industrial, or construction vehicle or machine, the hydraulic unit swashplate controller 143B places the hydraulic unit swashplate 143A in a neutral non-pumping and non-motoring position, disengages the hydraulic unit clutch 142, inactivates the first two way valve 144A so that any fluid incidentally pumped by the hydraulic unit 143 returns to the reservoir 146 with little resistance, and inactivates the second one way valve 144C, thereby isolating any hydraulic fluid stored under pressure in the pressurized hydraulic accumulator 145 for later use. Other embodiments of the present invention may omit the first two way valve 144A, relying only upon the second one way valve 144C to isolate any hydraulic fluid stored under pressure in the pressurized hydraulic accumulator 145.

The hydraulic unit swashplate controller 143B of the hydraulic energy recapture system 140 is directly or indirectly controlled, by way of an electrical, hydraulic, pneumatic, or mechanical connection with a service brake system 120 and/or a power shuttle system 130. The service brake system 120 includes a brake pedal 121, a brake valve 122 operated by the brake pedal 121, and service brakes 123 connected to the brake valve 122. Similarly, the power shuttle system 130 includes a shuttle lever 131, a shuttle valve 132 operated by the shuttle lever 131, and shuttle clutches 133 connected to the shuttle valve 132.

Turning now to FIGS. 2A through 2D, there is shown a detailed schematic of an exemplary embodiment of the present invention, being a hydraulic energy recapture system 240. An engine 20 is again connected to a transmission input shaft 211, which transmits power from the engine 20 to a power-shuttle transmission 210. The power-shuttle transmission 210 is part of the driveline 200 of the agricultural, industrial, or construction vehicle or machine, and has a transmission output shaft 214, which provides power to drive the axle or axles 250 of the agricultural, industrial, or construction vehicle or machine (not shown).

The power-shuttle 210 shown in FIGS. 2A through 2D has two parallel gear trains, or the functional equivalent thereof, one of which is a forward shuttle gear train 212B, and the other of which is a reverse shuttle gear train 213B. The forward shuttle gear train 212B is directly or indirectly connected to the transmission input shaft 211 by way of a forward shuttle clutch 212A, also designated CF, and is further directly or indirectly connected to the transmission output shaft 214. The reverse shuttle gear train 213B is directly or indirectly connected to the transmission input shaft 211 by way of a reverse shuttle clutch 213A, also designated CR, and is further directly or indirectly connected to the transmission output shaft 214. Further fixed or selectable transmission gearing may be included in the driveline 200, either between the engine 20 and the power-shuttle transmission 210, or between the transmission output shaft 214 and the axle or axles 250. When the forward shuttle clutch 212A, or CF, is engaged, the power-shuttle transmission 210 rotatably connects the transmission input shaft 211 and the transmission output shaft 214 in such a way that applying engine power causes the axle or axles 250 to rotate in a forward moving direction. When the reverse shuttle clutch 213A, or CR, is engaged, the power-shuttle transmission 210 rotatably connects the transmission input shaft 211 and the transmission output shaft 214 in such a way that applying engine power causes the axle or axles 250 to rotate in a reverse moving direction. As shown in FIGS. 2A through 2B, the embodiment of the present invention is in use with an axle 250 having a reduction gear 251 at its ends near the wheels and tires 252.

A hydraulic unit drive gear 241 is geared to the transmission output shaft 214, and selectively transmits power to and from a hydraulic unit 243 by way of a hydraulic unit clutch 242, also designated as CE. The hydraulic unit 243 may further be embodied as a variable displacement hydraulic pump/motor or as a bidirectional variable displacement hydraulic pump/motor, and may be provided with a hydraulic unit swashplate 243A, which is positioned by a hydraulic unit swashplate controller 243B, thereby varying the hydraulic pumping displacement of the hydraulic unit 243. The hydraulic unit 243 is capable of functioning as a variable displacement hydraulic pump, thereby storing vehicle or machine kinetic energy as potential energy by pumping hydraulic fluid into a pressurized hydraulic accumulator 245. The hydraulic unit 243 is further capable as functioning as a variable displacement hydraulic motor, thereby converting potential energy stored in the pressurized hydraulic accumulator 245 to vehicle or machine kinetic energy.

The hydraulic energy recapture system 240 may be directly or indirectly controlled by an individual control unit or ECU 260 having a number of control unit inputs 261 and a number of control unit outputs 262. The control unit inputs 261 include a throttle position input 261A, which is connected to a throttle (not shown) of the agricultural, construction, or industrial vehicle or machine. A brake pressure input 261B receives brake pressure information from a brake valve 222 or from a brake pedal 221 of a service brake system 220, which includes the brake pedal 221, the brake valve 222, and one or more service brake 223. The service brake 223 in FIG. 2A is shown in both graphic representation within the service brake system 220 and in schematic representation as connected to the axle 250, both representations representing the same one or more service brake 223.

A shuttle valve position input 261C receives position information from a shuttle lever 231 or a shuttle valve 232 of a power-shuttle system 230. The shuttle valve 232 is connected to the forward shuttle clutch 212A and to the reverse shuttle clutch 213A of the power-shuttle transmission 210. The power-shuttle system 230 includes the shuttle lever 231, the shuttle valve 232, and the forward shuttle clutch 212A and the reverse shuttle clutch 213A, together represented graphically as shuttle clutches 233 in FIG. 2A. The control unit inputs 261 of the individual control unit or ECU 260 further include a driveline sensor input 261D, which senses forward or reverse movement of the agricultural, construction, or industrial vehicle or machine by way of sensing rotation of the transmission output shaft 214 using a driveline sensor 261E.

The control unit outputs 262 include a service brake command output 262A, which controls or modifies actual application of the service brake 223. The control unit outputs 262 further include a forward shuttle clutch command output 262B and a reverse shuttle clutch command output 262C, also designated CF and CR, respectively, which controls or modifies engagement of the forward shuttle clutch 212A and reverse shuttle clutch 213A, respectively. The control unit outputs 262 further include a hydraulic unit clutch command output 262D, which controls engagement of the hydraulic unit clutch 242, also designated CE. The control unit outputs 262 further include a hydraulic unit swashplate command output 262E, which controls the hydraulic unit swashplate 243A by way of the hydraulic unit swashplate controller 243B. The control unit outputs 262 further include first and second valve command outputs 262F, which control a first two way valve 244A, if provided, and a second one way valve 244C.

When the hydraulic energy recapture system 240 is being used to convert kinetic energy from forward motion of the agricultural, industrial, or construction vehicle or machine to potential energy stored in the pressurized hydraulic accumulator 245, as shown in FIG. 2A, the individual control unit or ECU 260 commands the hydraulic unit clutch 242 to engage and commands the hydraulic unit swashplate controller 243B to position the hydraulic unit swashplate 243A of the hydraulic unit 243 so that the hydraulic unit 243 pumps hydraulic fluid from a reservoir 246 to the pressurized hydraulic accumulator 245, which again stores the hydraulic fluid under high pressure. To enable hydraulic communication between the hydraulic unit 243 and the pressurized hydraulic accumulator 245, the individual control unit or ECU 260 arranges the hydraulic energy recapture system 240 so that a first two way valve 244A is activated, directing the hydraulic fluid through a check valve 244B to the pressurized hydraulic accumulator 245. The individual control unit or ECU 260 commands a second one way valve 244C to remain inactive and closed, and pressure relief valve 244D provides pressure relief protection for the hydraulic unit 243 and the pressurized hydraulic accumulator 245. In an alternate embodiment of the present invention, no first two way valve 244A is provided, so that hydraulic fluid is directed directly through check valve 244B to the pressurized hydraulic accumulator 245.

In this way, the direction of hydraulic energy capture system power flow 21 is from the wheels and tires 252 of the axle 250 by way of forward direction of axle rotation 250A to the transmission output shaft 214. The transmission output shaft 214 transmits the hydraulic energy capture system power flow 21 by way of forward direction of transmission output shaft rotation 214A to the hydraulic unit drive gear 241, which transmits the hydraulic energy capture system power flow 21 by way of forward direction of hydraulic unit rotation 243C through the hydraulic unit clutch 242 to the hydraulic unit 243. The individual control unit or ECU 260 commands the hydraulic unit swashplate controller 243B to set the hydraulic unit swashplate 243A so that the hydraulic unit 243 pumps hydraulic fluid due to the forward direction of hydraulic unit rotation 243C. The hydraulic energy capture system power flow 21 proceeds thereafter by way of hydraulic flow and pressure from the hydraulic unit 243 to the pressurized hydraulic accumulator 245 by way of the first two way valve 244A, if provided, and by way of the check valve 244B.

In the situation wherein the hydraulic energy recapture system 240 is being used to convert kinetic energy from forward motion of the agricultural, industrial, or construction vehicle or machine to potential energy stored in the pressurized hydraulic accumulator 245, as shown in FIG. 2A, it is also possible that the individual control unit or ECU 260 may command the reverse shuttle clutch 213A to be slidingly engaged, so that the power-shuttle transmission 210 operates to absorb forward momentum in conjunction with the hydraulic energy recapture system 240.

When the hydraulic energy recapture system 240 is being used to convert potential energy stored in the pressurized hydraulic accumulator 245 to kinetic energy of the agricultural, industrial, or construction vehicle or machine moving in the reverse direction, as shown in FIG. 2B, the individual control unit or ECU 260 commands the hydraulic clutch 242 to engage and commands the hydraulic unit swashplate controller 243B to position the hydraulic unit swashplate 243A of the hydraulic unit 243 so that the hydraulic unit 243 acts as a hydraulic motor in the reverse direction. Hydraulic fluid flows under pressure from the pressurized hydraulic accumulator 245 through the hydraulic unit 243 to the reservoir 246. To enable hydraulic communication between the pressurized hydraulic accumulator 245 and the hydraulic unit, the individual control unit or ECU 260 arranges the hydraulic energy recapture system 240 so that both the first two way valve 244A and the second one way valve 244C are activated, thereby directing the hydraulic fluid to the hydraulic unit 243. In an alternate embodiment of the present invention wherein no first two way valve 244A is provided, the ECU 260 activates only the second one way valve 244C, thereby directing the hydraulic fluid to the hydraulic unit 243.

In this way, the direction of hydraulic energy capture system power flow 21 is from the pressurized hydraulic accumulator 245 by way of hydraulic flow and pressure through the second one way valve 244C and through the first two way valve 244A, if provided, to the hydraulic unit 243. The individual control unit or ECU 260 commands the hydraulic unit swashplate controller 243B to set the hydraulic unit swashplate 243A so that the hydraulic unit 243 acts as a hydraulic motor in reverse direction of hydraulic unit rotation 243D. Hydraulic unit clutch 242 transmits the hydraulic energy capture system power flow 21 by way of reverse direction of hydraulic unit rotation 243D to the hydraulic unit drive gear 241, which transmits the hydraulic energy capture system power flow 21 to the transmission output shaft 214. The transmission output shaft 214 in turn transmits the hydraulic energy capture system power flow 21 by way of reverse direction of transmission output shaft rotation 214B to the axle 250, which in turn transmits the hydraulic energy capture system power flow 21 by way of reverse direction of axle rotation 250B through the reduction gear 251 to the wheels and tires 252.

In the situation wherein the hydraulic energy recapture system 240 is being used to convert potential energy stored in the pressurized hydraulic accumulator 245 to kinetic energy of the agricultural, industrial, or construction vehicle or machine moving in the reverse direction, as shown in FIG. 2B, it is also possible that the individual control unit or ECU 260 may command the reverse shuttle clutch 213A to engage. In this way, the power-shuttle transmission 210 operates to direct engine power flow 22 by way of input shaft rotation 211A, in order to boost reverse acceleration of the agricultural, construction, or industrial vehicle or machine using both the engine 20 and the hydraulic energy recapture system 240.

When the hydraulic energy recapture system 240 is being used to convert kinetic energy from reverse motion of the agricultural, industrial, or construction vehicle or machine to potential energy stored in the pressurized hydraulic accumulator 245, as shown in FIG. 2C, the individual control unit or ECU 260 commands the hydraulic unit clutch 242 to engage and commands the hydraulic unit swashplate controller 243B to position the hydraulic unit swashplate 243A of the hydraulic unit 243 so that the hydraulic unit 243 pumps hydraulic fluid from a reservoir 246 to the pressurized hydraulic accumulator 245, which again stores the hydraulic fluid under high pressure. To enable hydraulic communication between the hydraulic unit 243 and the pressurized hydraulic accumulator 245, the individual control unit or ECU 260 again arranges the hydraulic energy recapture system 240 so that a first two way valve 244A is activated, directing the hydraulic fluid through a check valve 244B to the pressurized hydraulic accumulator 245. The individual control unit or ECU 260 commands a second one way valve 244C to remain inactive and closed, and pressure relief valve 244D provides pressure relief protection for the hydraulic unit 243 and the pressurized hydraulic accumulator 245. In an alternate embodiment of the present invention, no first two way valve 244A is provided, so that hydraulic fluid is directed directly through check valve 244B to the pressurized hydraulic accumulator 245.

In this way, the direction of hydraulic energy capture system power flow 21 is from the wheels and tires 252 of the axle 250 by way of reverse direction of axle rotation 250B to the transmission output shaft 214. The transmission output shaft 214 transmits the hydraulic energy capture system power flow 21 by way of reverse direction of transmission output shaft rotation 214G to the hydraulic unit drive gear 241, which transmits the hydraulic energy capture system power flow 21 by way of reverse direction of hydraulic unit rotation 243D through the hydraulic unit clutch 242 to the hydraulic unit 243. The individual control unit or ECU 260 commands the hydraulic unit swashplate controller 243B to set the hydraulic unit swashplate 243A so that the hydraulic unit 243 pumps hydraulic fluid due to the reverse direction of hydraulic unit rotation 243D. The hydraulic energy capture system power flow 21 proceeds thereafter by way of hydraulic flow and pressure from the hydraulic unit 243 to the pressurized hydraulic accumulator 245 by way of the first two way valve 244A, if provided, and by way of the check valve 244B.

In the situation wherein the hydraulic energy recapture system 240 is being used to convert kinetic energy from reverse motion of the agricultural, industrial, or construction vehicle or machine to potential energy stored in the pressurized hydraulic accumulator 245, as shown in FIG. 2C, it is also possible that the individual control unit or ECU 260 may command the forward shuttle clutch 212A to be slidingly engaged, so that the power-shuttle transmission 210 operates to absorb reverse momentum in conjunction with the hydraulic energy recapture system 240.

When the hydraulic energy recapture system 240 is being used to convert potential energy stored in the pressurized hydraulic accumulator 245 to kinetic energy of the agricultural, industrial, or construction vehicle or machine moving in the forward direction, as shown in FIG. 2D, the individual control unit or ECU 260 commands the hydraulic clutch 242 to engage and commands the hydraulic unit swashplate controller 243B to position the hydraulic unit swashplate 243A of the hydraulic unit 243 so that the hydraulic unit 243 acts as a hydraulic motor in the forward direction. Hydraulic fluid flows under pressure from the pressurized hydraulic accumulator 245 through the hydraulic unit 243 to the reservoir 246. To enable hydraulic communication between the pressurized hydraulic accumulator 245 and the hydraulic unit, the individual control unit or ECU 260 again arranges the hydraulic energy recapture system 240 so that both the first two way valve 244A and the second one way valve 244C are activated, thereby directing the hydraulic fluid to the hydraulic unit 243. In an alternate embodiment of the present invention wherein no first two way valve 244A is provided, the ECU 260 activates only the second one way valve 244C, thereby directing the hydraulic fluid to the hydraulic unit 243.

In this way, the direction of hydraulic energy capture system power flow 21 is from the pressurized hydraulic accumulator 245 by way of hydraulic flow and pressure through the second one way valve 244C and through the first two way valve 244A, if provided, to the hydraulic unit 243. The individual control unit or ECU 260 commands the hydraulic unit swashplate controller 243B to set the hydraulic unit swashplate 243A so that the hydraulic unit 243 acts as a hydraulic motor in forward direction of hydraulic unit rotation 243C. Hydraulic unit clutch 242 transmits the hydraulic energy capture system power flow 21 by way of forward direction of hydraulic unit rotation 243C to the hydraulic unit drive gear 241, which transmits the hydraulic energy capture system power flow 21 to the transmission output shaft 214. The transmission output shaft 214 in turn transmits the hydraulic energy capture system power flow 21 by way of forward direction of transmission output shaft rotation 214A to the axle 250, which in turn transmits the hydraulic energy capture system power flow 21 by way of forward direction of axle rotation 250A through the reduction gear 251 to the wheels and tires 252.

In the situation wherein the hydraulic energy recapture system 240 is being used to convert potential energy stored in the pressurized hydraulic accumulator 245 to kinetic energy of the agricultural, industrial, or construction vehicle or machine moving in the forward direction, as shown in FIG. 2D, it is also possible that the individual control unit or ECU 260 may command the forward shuttle clutch 212A to engage. In this way, the power-shuttle transmission 210 operates to direct engine power flow 22 by way of input shaft rotation 211A, in order to boost forward acceleration of the agricultural, construction, or industrial vehicle or machine using both the engine 20 and the hydraulic energy recapture system 240.

As with the embodiment of the present invention shown in FIGS. 1A and 1B, when the hydraulic energy recapture system 240 in FIGS. 2A through 2D is not being used either to convert kinetic energy of the agricultural, industrial, or construction vehicle or machine to potential energy in the pressurized hydraulic accumulator 245, or to convert potential energy stored in the pressurized hydraulic accumulator 245 to kinetic energy of the agricultural, industrial, or construction vehicle or machine, the individual control unit or ECU 260 commands the hydraulic unit swashplate controller 243B to place the hydraulic unit swashplate 243A in a neutral non-pumping and non-motoring position. The individual control unit or ECU 260 then commands the hydraulic unit clutch 242 to disengage, inactivates the first two way valve 244A, if provided, so that any fluid incidentally pumped by the hydraulic unit 243 returns to the reservoir 246 with little resistance, and inactivates the second one way valve 244C, thereby isolating any hydraulic fluid stored under pressure in the pressurized hydraulic accumulator 245 for later use.

Turning now to FIG. 3, a chart 300 of brake torque curves is shown, exemplifying the typical operation of embodiments of the present invention. A target brake torque 301 is indicated by an operator of the agricultural, construction, or industrial vehicle or machine by pressing on the brake pedal (not shown), or by placing the shuttle lever (not shown) in a direction setting opposite to the current direction of motion of the vehicle or machine. The individual control unit or ECU 260 responds to the target brake torque 301 by initially applying the service brake 223 and/or slidably engaging the appropriate shuttle clutch 212A or 213A. This is done at least for a duration of time long enough for the hydraulic unit clutch 242 to engage, for the hydraulic unit swashplate controller 243B to move the hydraulic unit swashplate 243A into proper position, for the first two way valve 244A to activate, if provided, and for a minimum amount of backpressure to build between the pressurized hydraulic accumulator 245 and the hydraulic unit 243. For simplicity of illustration, this is represented in FIG. 3 as the brief application of service brake 223 as shown by the service brake torque 302, although this may be accomplished using the service brake 223, the appropriate shuttle clutch 212A or 213A, or both the service brake 223 and the appropriate shuttle clutch 212A or 213A.

Braking torque 303 generated by the hydraulic unit 243 of the hydraulic energy recapture system 240 acting as a motor then rises to meet the demand of the target brake torque 301, as commanded by the individual control unit or ECU 260. Once this happens, the individual control unit or ECU 260 commands the service brake 223 to fully or partially release, as appropriate, and/or commands the shuttle clutch 212A or 213A to fully or partially disengage. Thereafter, the target brake torque 301 is accomplished by way of the hydraulic unit 243 of the hydraulic energy recapture system 240 acting as a motor, up to the capability of the hydraulic unit 243 and/or the capability of the pressurized hydraulic accumulator 245. If the capability of the hydraulic unit 243, or the capability of any other portion of the hydraulic energy recapture system 240, is insufficient to meet the target brake torque 301, or if the capacity of the pressurized hydraulic accumulator 245 to store pressurized hydraulic fluid is reached, then the individual control unit or ECU 260 commands the service brake 223 to fully or partially apply, and/or commands the shuttle clutch 212A or 213A to fully or partially slidably engage, as appropriate. In this way, the service brake 223 and/or the shuttle clutches 212A and 213A are required to absorb as little energy as possible, and a maximum amount of vehicle or machine kinetic energy is saved as potential energy for later usage.

Figure 4B:
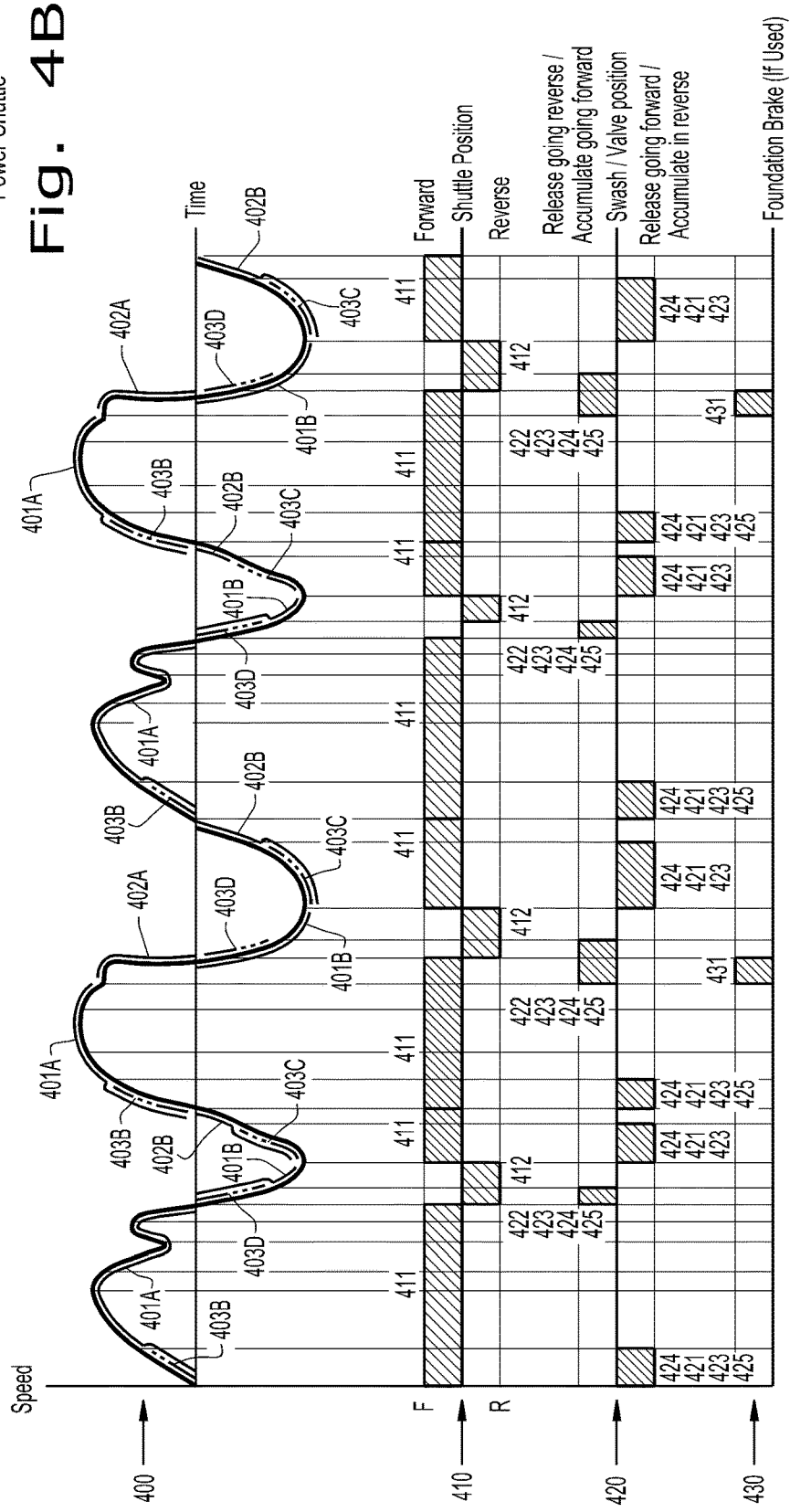
FIG. 4B is a set of charts on a common vertical axis, including vehicle speed, shuttle clutch position, hydraulic unit swashplate position, and service brake position, in accordance with an exemplary embodiment of the present invention.

Turning now to FIGS. 4A and 4B, each shows a vehicle speed chart 400, a shuttle clutch position chart 410, a hydraulic unit swashplate position chart 420, and a service brake position chart 430, sharing a common vertical axis. FIGS. 4A and 4B each depict two operational cycles of a loader as it loads a dump truck, as an illustrative example of operation of embodiments of the present invention. Considering the vehicle speed chart 400, it can be seen that the loader accelerates, as towards a load pile, decelerates as it engages the load pile, reaccelerates slightly as it shoves its bucket into the load pile, and decelerates under the influence of the load pile until it reaches zero velocity, where the speed curve crosses the horizontal axis of the vehicle speed chart 400. The loader then accelerates in reverse as it backs away from the load pile, and then decelerates back to zero velocity in preparation for again changing directions. The loader then accelerates forward as it approaches the dump truck, decelerates slightly, and then comes to a rapid stop at the edge of the dump truck. The loader then accelerates in reverse as it backs away from the dump truck, and then decelerates back to zero velocity in preparation for again changing directions, and restarts the cycle.

Considering in particular FIG. 4A, an embodiment of the present invention is shown employing sequential application of the hydraulic energy recapture system and of the forward shuttle clutch or reverse shuttle clutch. During the initial acceleration of the loader towards the load pile, shown as the first line 403B in the vehicle speed chart 400, the individual control unit or ECU 260 commands the hydraulic clutch 142, 242 to engage, shown as the first crosshatched area 423 in the hydraulic unit swashplate position chart 420. The individual control unit or ECU 260 also commands the hydraulic unit swashplate controller 143B, 243B to position the hydraulic unit swashplate 143A, 243A in a forward motoring position, which may be the same as the reverse pumping position, shown as the first crosshatched area 421, which is coextensive with the first crosshatched area 423. The individual control unit or ECU 260 also commands the first two way valve 144A, 244A to activate, if provided, shown as the first crosshatched area 424, which is coextensive with the first crosshatched areas 423 and 421. The individual control unit or ECU 260 also commands the second one way valve 144C, 244C to activate, shown as the first crosshatched area 425, which is coextensive with the first crosshatched areas 421, 423, and 424. At this point, the hydraulic energy recapture system accelerates the loader forward by converting potential energy stored in the pressurized hydraulic accumulator 145, 245 to forward kinetic energy of the loader.

Once the pressurized hydraulic fluid in the pressurized hydraulic accumulator 145, 245 is exhausted, the individual control unit or ECU 260 commands the hydraulic unit swashplate controller 143B, 243B to position the hydraulic unit swashplate 143A, 243A in a neutral position, commands the hydraulic unit clutch 142, 242 to disengage, and commands the first two way valve 144A, 244A, if provided, and the second one way valve 144C, 244C, to deactivate. The individual control unit or ECU 260 commands the forward shuttle clutch 212A to engage, shown as the first crosshatched area 411 in the shuttle clutch position chart 410. Thereafter, the engine of the loader applies power by way of the power shuttle transmission in the forward direction, shown as the first line segment 401A in the vehicle speed chart 400, until the loader bucket is full and the resistance of the load pile brings the loader to a halt.

In order to back the loader away from the pile, the individual control unit or ECU 260 now commands the hydraulic unit clutch 142, 242 to engage, shown as second crosshatched area 423 in the hydraulic unit swashplate position chart 420. The individual control unit or ECU 260 also commands the hydraulic unit swashplate controller 143B, 243B to position the hydraulic unit swashplate 143A, 243A in a reverse motoring position, which may be the same as the forward pumping position, shown as the first crosshatched area 422, which is coextensive with the second crosshatched area 423. The individual control unit or ECU 260 also commands the first two way valve 144A, 244A to activate, if provided, shown as the second crosshatched area 424, which is coextensive with the first crosshatched area 422 and second crosshatched area 423. The individual control unit or ECU 260 also commands the second one way valve 144C, 244C to activate, shown as the first crosshatched area 425, which is coextensive with the first crosshatched area 422, and second crosshatched areas 423 and 424). At this point, the hydraulic energy recapture system accelerates the loader in reverse by converting potential energy stored in the pressurized hydraulic accumulator 145, 245 to reverse kinetic energy of the loader. This is shown as first line segment 403D in the vehicle speed chart 400.

Once the pressurized hydraulic fluid in the pressurized hydraulic accumulator 145, 245 is exhausted, the individual control unit or ECU 260 commands the hydraulic unit swashplate controller 143B, 243B to position the hydraulic unit swashplate 143A, 243A in a neutral position, commands the hydraulic unit clutch 142, 242 to disengage, and commands the first two way valve 144A, 244A, if provided, and the second one way valve 144C, 244C to deactivate. The individual control unit or ECU 260 then commands the reverse shuttle clutch 213A to engage, shown as the first crosshatched area 412 in the shuttle clutch position chart 410. The loader then continues to accelerate in reverse away from the load pile, shown as the first line segment 401B in the vehicle speed chart 400.

Next, during deceleration in the reverse direction, the individual control unit or ECU 260 commands the hydraulic unit clutch 142, 242 to engage, shown as the third crosshatched area 423 in the hydraulic unit swashplate position chart 420. The individual control unit or ECU 260 also commands the hydraulic unit swashplate controller 143B, 243B to position the hydraulic unit swashplate 143A, 243A in a reverse pumping position, shown as the second crosshatched area 421, which is coextensive with the third crosshatched area 423. The individual control unit or ECU 260 also commands the first two way valve 144A, 244A to activate, if provided, shown as the third crosshatched area 424, which is coextensive with the second crosshatched area 421 and the third crosshatched area 423.

At this point the hydraulic energy recapture system slows the loader by converting reverse kinetic energy of the loader to potential energy stored in the pressurized hydraulic accumulator 145, 245. This is represented as the first line segment 403C in the vehicle speed chart 400. If the capability of the hydraulic unit 143, 243 to provide braking torque is exceeded, or if the pressurized hydraulic accumulator 145, 245 reaches its maximum capacity, the individual control unit or ECU 260 then commands the forward shuttle clutch 212A to slidably engage. This is represented as the first line segment 402B in the vehicle speed chart 400. At the same time, the individual control unit or ECU 260 commands the hydraulic unit swashplate controller 143B, 243B to position the hydraulic unit swashplate 143A, 243A in a neutral position, commands the hydraulic unit clutch 142, 242 to disengage, and commands the first two way valve 144A, 244A, if provided, and the second one way valve 144C, 244C, to deactivate.

Once the loader comes to zero velocity and it is again desired to accelerate forward toward the dump truck, the individual control unit or ECU 260 commands the hydraulic unit clutch 142, 242 to re-engage, shown as the fourth crosshatched area 423 in the hydraulic unit swashplate position chart 420. The individual control unit or ECU 260 also commands the hydraulic unit swashplate controller 143B, 243B to position the hydraulic unit swashplate 143A, 243A in a forward motoring position, which may be the same as the reverse pumping position, shown as the third crosshatched area 421, which is coextensive with the fourth crosshatched area 423. The individual control unit or ECU 260 also commands the first two way valve 144A, 244A to activate, if provided, shown as the fourth crosshatched area 424, which is coextensive with the fourth crosshatched area 423 and the third crosshatched area 421. The individual control unit or ECU 260 also commands the second one way valve 144C, 244C to activate, shown as the third crosshatched area 425, which is coextensive with the third crosshatched area 421, the fourth crosshatched area 423, and the fourth crosshatched area 424. At this point, the hydraulic energy recapture system accelerates the loader forward by converting potential energy stored in the pressurized hydraulic accumulator 145, 245 to forward kinetic energy of the loader. This is shown as second line segment 403B in the vehicle speed chart 400.

Once the pressurized hydraulic fluid in the pressurized hydraulic accumulator 145, 245 is exhausted, the individual control unit or ECU 260 commands the hydraulic unit swashplate controller 143B, 243B to position the hydraulic unit swashplate 143A, 243A in a neutral position, commands the hydraulic unit clutch 142, 242 to disengage, and commands the first two way valve 144A, 244A, if provided, and the second one way valve 144C, 244C to deactivate. The individual control unit or ECU 260 then commands the forward shuttle clutch 212A to engage, shown as the third crosshatched area 411 in the shuttle clutch position chart 410. The loader then continues to accelerate toward the dump truck, shown as the second line segment 401A in the vehicle speed chart 400.

Next, during deceleration on approach to the dump truck, the individual control unit or ECU 260 initially applies the service brake 223, shown as the first crosshatched area 431 in the service brake position chart 430, while commanding the hydraulic unit clutch 142, 242 to engage, shown as the fifth crosshatched area 423 in the hydraulic unit swashplate position chart 420. The individual control unit or ECU 260 also commands the hydraulic unit swashplate controller 143B, 243B to position the hydraulic unit swashplate 143A, 243A in a forward pumping position, shown as the second crosshatched area 422, which is coextensive with the fifth crosshatched area 423. The individual control unit or ECU 260 also commands the first two way valve 144A, 244A to activate, if provided, shown as the fifth crosshatched area 424, which is coextensive with the second crosshatched area 422 and the fifth crosshatched area 423. The individual control unit or ECU 260 may command the service brake 223 to remain applied only until the braking torque generated by the hydraulic unit 143, 243 rises to meet the demand of the target brake torque, as illustrated in FIG. 3. Alternately, as shown as first line segment 402A in the vehicle speed chart 400, the individual control unit or ECU 260 may command the service brake 223 to remain applied until the loader comes to a complete stop, depending on demand for braking torque and upon the ability of the hydraulic unit 143, 243 to meet that demand.

In order to back the loader away from the dump truck, the individual control unit or ECU 260 commands the hydraulic unit clutch 142, 242 to remain engaged, shown as the continuation of the fifth crosshatched area 423 in the hydraulic unit swashplate position chart 420. The individual control unit or ECU 260 also commands the hydraulic unit swashplate controller 143B, 243B to position the hydraulic unit swashplate 143A, 243A in a reverse motoring position, which may be the same as the forward pumping position, shown as the continuation of the second crosshatched area 422, which is coextensive with the continuation of the fifth crosshatched area 423. The individual control unit or ECU 260 also commands the first two way valve 144A, 244A to remain activated, if provided, shown as the continuation of the fifth crosshatched area 424, which is coextensive with the continuation of the second crosshatched areas 422 and the continuation of the fifth crosshatched area 423. The individual control unit or ECU 260 also commands the second one way valve 144C, 244C to activate, shown as the fourth crosshatched area 425, which is coextensive with the continuation of the second crosshatched area 422, the continuation of the fifth crosshatched area 423, and the continuation of the fifth crosshatched area 424. At this point, the hydraulic energy recapture system accelerates the loader in reverse by converting potential energy stored in the pressurized hydraulic accumulator 145, 245 to reverse kinetic energy of the loader. This is shown as second line segment 403D in the vehicle speed chart 400.

Once the pressurized hydraulic fluid in the pressurized hydraulic accumulator 145, 245 is exhausted, the individual control unit or ECU 260 commands the hydraulic unit swashplate controller 143B, 243B to position the hydraulic unit swashplate 143A, 243A in a neutral position, commands the hydraulic unit clutch 142, 242 to disengage, and commands the first two way valve 144A, 244A, if provided, and the second one way valve 144C, 244C to deactivate. The individual control unit or ECU 260 then commands the reverse shuttle clutch 213A to engage, shown as the second crosshatched area 412 in the shuttle clutch position chart 410. The loader then continues to accelerate in reverse away from the dump truck, shown as the second line segment 401B in the vehicle speed chart 400.

Finally, deceleration in the reverse direction is as before. The individual control unit or ECU 260 commands the hydraulic unit clutch 142, 242 to engage, shown as the sixth crosshatched area 423 in the hydraulic unit swashplate position chart 420. The individual control unit or ECU 260 also commands the hydraulic unit swashplate controller 143B, 243B to position the hydraulic unit swashplate 143A, 243A in a reverse pumping position, shown as the fourth crosshatched area 421, which is coextensive with the sixth crosshatched area 423. The individual control unit or ECU 260 also commands the first two way valve 144A, 244A to activate, if provided, shown as the sixth crosshatched area 424, which is coextensive with the fourth crosshatched area 421 and the sixth crosshatched area 423.

At this point, the hydraulic energy recapture system slows the loader by converting reverse kinetic energy of the loader to potential energy stored in the pressurized hydraulic accumulator 145, 245. This is represented as the second line segment 403C in the vehicle speed chart 400. Again, if the capability of the hydraulic unit 143, 243 to provide braking torque is exceeded, or once the pressurized hydraulic accumulator 145, 245 reaches its maximum capacity, the individual control unit or controller then commands the forward shuttle clutch 212A to again slidably engage. This is represented as the second line segment 402B in the vehicle speed chart 400. Hereafter, the cycle repeats.

Considering now FIG. 4B, an embodiment of the present invention is shown employing simultaneous application of the hydraulic energy recapture system and of the forward shuttle clutch or reverse shuttle clutch. This embodiment is generally similar to the embodiment of the present invention employing sequential application of the hydraulic energy recapture system and of the forward shuttle clutch or reverse shuttle clutch shown in FIG. 4A. However, during the periods of acceleration, such as accelerating in reverse away from the load pile, accelerating forwards towards the dump truck, and accelerating in reverse away from the dump truck, both the hydraulic energy recapture system and the appropriate shuttle clutch are engaged throughout the period of acceleration.

That is to say, when the loader is accelerating in reverse, the individual control unit or ECU 260 commands the hydraulic unit clutch 142, 242 to engage, shown for example as second crosshatched area 423 in the hydraulic unit swashplate position chart 420. The individual control unit or ECU 260 also commands the hydraulic unit swashplate controller 143B, 243B to position the hydraulic unit swashplate 143A, 243A in a reverse motoring position, shown for example as the first crosshatched area 422, which is coextensive with the second crosshatched area 423. The individual control unit or ECU 260 also commands the first two way valve 144A, 244A to activate, if provided, shown for example as the second crosshatched area 424, which is coextensive with the first crosshatched areas 422 and second crosshatched area 423. The individual control unit or ECU 260 also commands the second one way valve 144C, 244C to activate, shown as the second crosshatched area 425, which is coextensive with the first crosshatched area 422, and with the second crosshatched areas 423 and 424.

The individual control unit or ECU 260 further commands the reverse shuttle clutch 213A to engage at the same time, shown as the first crosshatched area 412 in the shuttle clutch position chart 410. In this way, both the hydraulic energy recapture system and the power-shuttle transmission accelerates the loader in reverse. If the pressurized hydraulic fluid in the pressurized hydraulic accumulator 145, 245 is exhausted and reverse acceleration is still desired, the individual control unit or ECU 260 commands the hydraulic unit swashplate controller 143B, 243B to position the hydraulic unit swashplate 143A, 243A in a neutral position, commands the hydraulic unit clutch 142, 242 to disengage, and commands the first two way valve 144A, 244A, if provided, and the second one way valve 144C, 244C to deactivate, while commanding the reverse shuttle clutch 213A to remain engaged.

Similarly, when the loader is accelerating forward, the individual control unit or ECU 260 commands the hydraulic unit clutch 142, 242 to engage, shown for example as the fourth crosshatched area 423 in the hydraulic unit swashplate position chart 420. The individual control unit or ECU 260 also commands the hydraulic unit swashplate controller 143B, 243B to position the hydraulic unit swashplate 143A, 243A in a forward motoring position, shown for example as the third crosshatched area 421, which is coextensive with the fourth crosshatched area 423. The individual control unit or ECU 260 also commands the first two way valve 144A, 244A to activate, if provided, shown for example as the fourth crosshatched area 424, which is coextensive with the third crosshatched area 421 and the fourth crosshatched area 423. The individual control unit or ECU 260 also commands the second one way valve 144C, 244C to activate, shown as the third crosshatched area 425, which is coextensive with the third crosshatched area 421, the fourth crosshatched area 423, and the fourth crosshatched area 424.

The individual control unit or ECU 260 further commands the forward shuttle clutch 212A to engage at the same time, shown as the continuance of the second crosshatched area 411 in the shuttle clutch position chart 410. In this way, both the hydraulic energy recapture system and the power-shuttle transmission accelerates the loader forward. Again, if the pressurized hydraulic fluid in the pressurized hydraulic accumulator 145, 245 is exhausted and forward acceleration is still desired, the individual control unit or ECU 260 commands the hydraulic unit swashplate controller 143B, 243B to position the hydraulic unit swashplate 143A, 243A in a neutral position, commands the hydraulic unit clutch 142, 242 to disengage, and commands the first two way valve 144A, 244A, if provided, and the second one way valve 144C, 244C to deactivate, while commanding the forward shuttle clutch 212A to remain engaged.

Figure 4C:
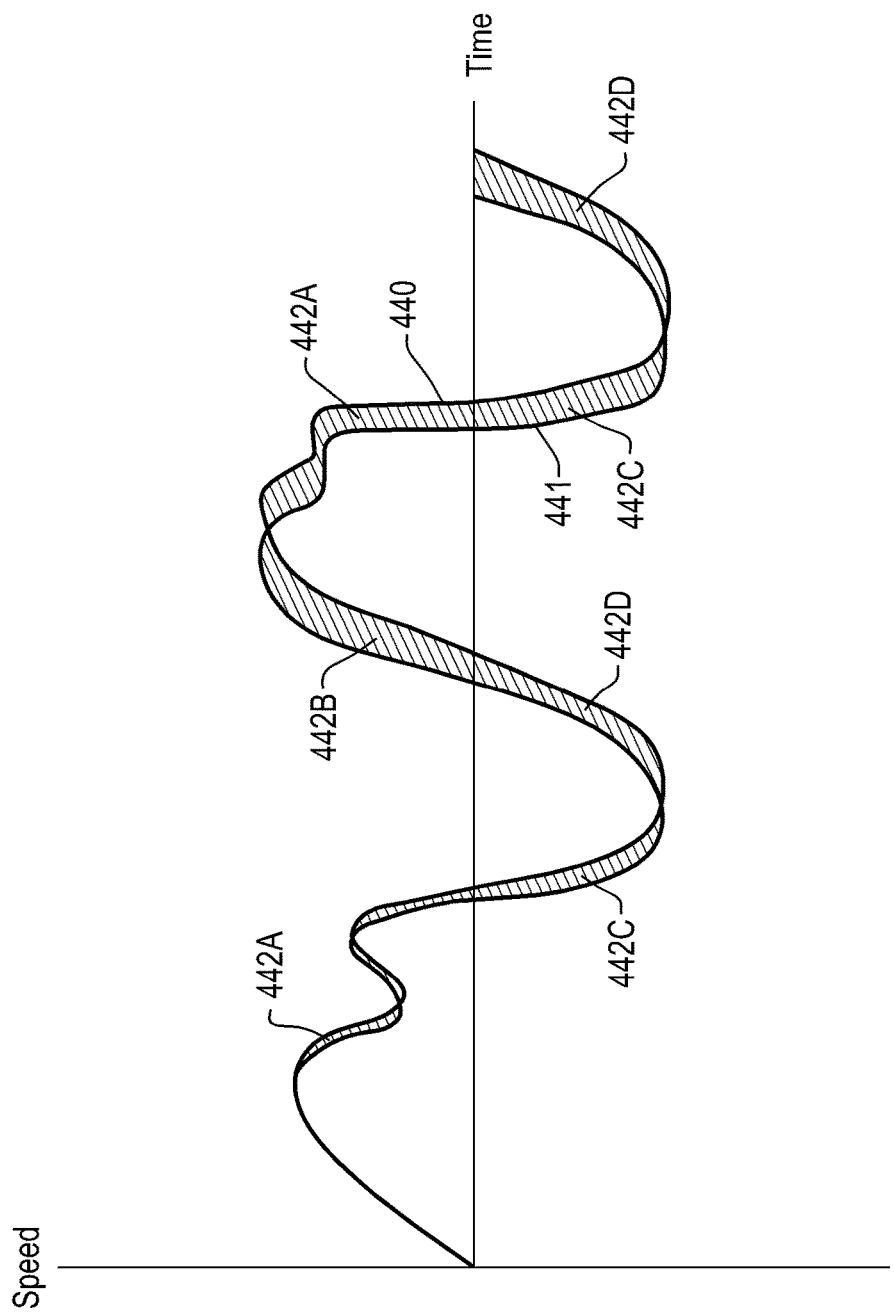
FIG. 4C is a comparative vehicle speed chart between an exemplary embodiment of the present invention and an embodiment of the prior art.

FIG. 4C shows vehicle speed versus time and compares the performance of an agricultural, construction, or industrial vehicle or machine utilizing an embodiment of the present invention and an agricultural, construction, or industrial vehicle or machine of the prior art. Curve 440 represents the speed of an agricultural, construction, or industrial vehicle or machine of the prior art. Curve 441 represents the speed of an agricultural, construction, or industrial vehicle or machine utilizing an embodiment of the present invention. In the regions designated 442A, the vehicle or machine utilizing an embodiment of the present invention undergoes greater forward deceleration due to use of the hydraulic energy recapture system. In the regions designated 442C, the vehicle or machine utilizing an embodiment of the present invention undergoes greater reverse acceleration due to use of the hydraulic energy recapture system. In the regions designated 442D, the vehicle or machine utilizing an embodiment of the present invention undergoes greater reverse deceleration due to use of the hydraulic energy recapture system. In the region 442B, the vehicle or machine utilizing an embodiment of the present invention undergoes greater forward acceleration due to use of the hydraulic energy recapture system. In this way, an agricultural, construction, or industrial vehicle or machine utilizing an embodiment of the present invention can accomplish an operational cycle in less time, resulting in greater productivity.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural, construction, or industrial vehicle or machine having a driveline, comprising:
    an engine;
    a power-shuttle transmission connected to said engine, said power-shuttle transmission having an input shaft and an output shaft, said power-shuttle transmission further having a forward shuttle gear train, and a reverse shuttle gear train in parallel with said forward shuttle gear train, said forward shuttle gear train having a forward shuttle clutch selectively coupling said forward shuttle gear train with said input shaft, said forward shuttle gear train further driving said output shaft when said forward shuttle clutch is engaged, said reverse shuttle gear train having a reverse shuttle clutch selectively coupling said reverse shuttle gear train with said input shaft, said reverse shuttle gear train further driving said output shaft when said reverse shuttle clutch is engaged;
    at least one drive axle driven by said output shaft of said power-shuttle transmission, said at least one drive axle having at least one service brake;
    a hydraulic energy recapture system coupled to said output shaft of said power-shuttle transmission, said hydraulic energy recapture system comprising:
        a hydraulic unit coupled with said output shaft of said power-shuttle transmission, said hydraulic unit being operable to convert rotational power to hydraulic pressure and flow, and to convert hydraulic pressure and flow to rotational power; and
        a pressurized hydraulic accumulator in hydraulic communication with said hydraulic unit operable to store hydraulic fluid under pressure; and
    a first two way valve selectively providing hydraulic communication between said hydraulic unit and a reservoir, or between said hydraulic unit and a second one way valve in parallel hydraulic communication with a check valve, said check valve providing one-way hydraulic communication from said first two way valve to said pressurized hydraulic accumulator, and said second one way valve providing hydraulic communication between said pressurized hydraulic accumulator and said first two way valve.

2. The agricultural, construction, or industrial vehicle or machine of claim 1, wherein:
    said hydraulic unit functioning as one of a variable displacement hydraulic pump or motor and a bidirectional variable displacement hydraulic pump or motor; and
    said hydraulic unit further having a hydraulic unit swashplate controlled by a hydraulic unit swashplate controller.

3. The agricultural, construction, or industrial vehicle or machine of claim 2, further comprising:
    a hydraulic unit clutch selectively coupling said hydraulic unit with said output shaft of said power-shuttle transmission.

4. The agricultural, construction, or industrial vehicle or machine of claim 3, further comprising:
- an individual control unit or ECU directly or indirectly connected to said at least one service brake, to said forward shuttle clutch, to said reverse shuttle clutch, to said hydraulic unit swashplate controller, to said hydraulic unit clutch, to said first two way valve, and to said second one way valve;
- said individual control unit or ECU further receiving input from at least one of a throttle operator input device, a brake operator input device, and a shuttle clutch operator input device.

5. The agricultural, construction, or industrial vehicle or machine of claim 4, wherein:
- said individual control unit or ECU being configured upon demand for acceleration to at least one of:
- sequentially command said hydraulic unit to convert hydraulic pressure and flow from said pressurized hydraulic accumulator to rotational power delivered to said output shaft of said power-shuttle transmission, and, upon exhaustion of said hydraulic pressure and flow from said pressurized hydraulic accumulator, command one of said forward shuttle clutch and said reverse shuttle clutch to engage and deliver rotational power from said engine through one of said forward shuttle gear train and said reverse shuttle gear train to said output shaft of said power-shuttle transmission, and
- simultaneously command said hydraulic unit to convert hydraulic pressure and flow from said pressurized hydraulic accumulator to rotational power delivered to said output shaft of said power-shuttle transmission and command one of said forward shuttle clutch and said reverse shuttle clutch to engage and deliver rotational power from said engine through one of said forward shuttle gear train and said reverse shuttle gear train to said output shaft of said power-shuttle transmission.

6. The agricultural, construction, or industrial vehicle or machine of claim 4, wherein:
- said individual control unit or ECU being configured upon demand for deceleration to at least one of initially command said at least one service brake to apply, and initially command one of said forward shuttle clutch and said reverse shuttle clutch to slidably engage;
- said individual control unit or ECU being further configured, upon demand for deceleration, to command said hydraulic unit to convert rotational power delivered by said output shaft of said power-shuttle transmission to hydraulic pressure and flow delivered to said pressurized hydraulic accumulator; and
- said individual control unit or ECU being further configured, upon build-up of a minimum amount of back-pressure sufficient for said hydraulic unit to provide a target brake torque to said output shaft of said power-shuttle transmission, to at least one of command said at least one service brake to release, and command one of said forward shuttle clutch and said reverse shuttle clutch to disengage.

7. A hydraulic energy recapture system for an agricultural, construction, or industrial vehicle or machine having an engine, a driveline, and at least one drive axle, said at least one drive axle having at least one service brake, said hydraulic energy recapture system comprising:
- a power-shuttle transmission configured for connecting to the engine, said power-shuttle transmission having an input shaft and an output shaft, said power-shuttle transmission further having a forward shuttle gear train, and a reverse shuttle gear train in parallel with said forward shuttle gear train, said forward shuttle gear train having a forward shuttle clutch selectively coupling said forward shuttle gear train with said input shaft, said forward shuttle gear train further driving said output shaft when said forward shuttle clutch is engaged, said reverse shuttle gear train having a reverse shuttle clutch selectively coupling said reverse shuttle gear train with said input shaft, said reverse shuttle gear train further driving said output shaft when said reverse shuttle clutch is engaged;
- said output shaft of said power-shuttle transmission is configured for driving the at least one drive axle;
- a hydraulic unit coupled with said output shaft of said power-shuttle transmission, said hydraulic unit being operable to convert rotational power to hydraulic pressure and flow, and to convert hydraulic pressure and flow to rotational power;
- a pressurized hydraulic accumulator in hydraulic communication with said hydraulic unit operable to store hydraulic fluid under pressure; and
- a first two way valve selectively providing hydraulic communication between said hydraulic unit and a reservoir, or between said hydraulic unit and a second one way valve in parallel hydraulic communication with a check valve, said check valve providing one-way hydraulic communication from said first two way valve to said pressurized hydraulic accumulator, and said second one way valve providing hydraulic communication between said pressurized hydraulic accumulator and said first two way valve.

8. The hydraulic energy recapture system of claim 7, wherein:
- said hydraulic unit functioning as one of a variable displacement hydraulic pump or motor and a bidirectional variable displacement hydraulic pump or motor; and
- said hydraulic unit further having a hydraulic unit swashplate controlled by a hydraulic unit swashplate controller.

9. The hydraulic energy recapture system of claim 8, further comprising:
- a hydraulic unit clutch selectively coupling said hydraulic unit with said output shaft of said power-shuttle transmission.

10. The hydraulic energy recapture system of claim 9, further comprising:
- an individual control unit or ECU configured for directly or indirectly connecting to the at least one service brake, to said forward shuttle clutch, to said reverse shuttle clutch, to said hydraulic unit swashplate controller, to said hydraulic unit clutch, to said first two way valve, and to said second one way valve;
- said individual control unit or ECU further receiving input from at least one of a throttle operator input device, a brake operator input device, and a shuttle clutch operator input device.

11. The hydraulic energy recapture system of claim 10, wherein:
- said individual control unit or ECU being configured upon demand for acceleration to at least one of:
- sequentially command said hydraulic unit to convert hydraulic pressure and flow from said pressurized hydraulic accumulator to rotational power delivered to said output shaft of said power-shuttle transmission, and, upon exhaustion of said hydraulic pressure and flow from said pressurized hydraulic accumulator, command one of said forward shuttle clutch and said reverse shuttle clutch to engage and deliver rotational power from said engine through one of said forward shuttle gear train and said reverse shuttle gear train to said output shaft of said power-shuttle transmission, and simultaneously command said hydraulic unit to convert hydraulic pressure and flow from said pressurized hydraulic accumulator to rotational power delivered to said output shaft of said power-shuttle transmission and command one of said forward shuttle clutch and said reverse shuttle clutch to engage and deliver rotational power from said engine through one of said forward shuttle gear train and said reverse shuttle gear train to said output shaft of said power-shuttle transmission.

12. The hydraulic energy recapture system of claim 10, wherein:

said individual control unit or ECU being configured upon demand for deceleration to at least one of initially command the at least one service brake to apply, and initially command one of said forward shuttle clutch and said reverse shuttle clutch to slidably engage;

said individual control unit or ECU being further configured, upon demand for deceleration, to command said hydraulic unit to convert rotational power delivered by said output shaft of said power-shuttle transmission to hydraulic pressure and flow delivered to said pressurized hydraulic accumulator; and said individual control unit or ECU being further configured, upon build-up of a minimum amount of back-pressure sufficient for said hydraulic unit to provide a target brake torque to said output shaft of said power-shuttle transmission, to at least one of command said at least one service brake to release, and command one of said forward shuttle clutch and said reverse shuttle clutch to disengage.

13. A method of storing kinetic energy of an agricultural, construction, or industrial vehicle or machine as potential energy, and of releasing the potential energy as kinetic energy of the agricultural or industrial vehicle or machine, the agricultural or industrial vehicle or machine having an engine, a driveline, and at least one drive axle having at least one service brake, comprising the steps of:

connecting a power-shuttle transmission to the engine, said power-shuttle transmission having an input shaft and an output shaft, said power-shuttle transmission further having a forward shuttle gear train, and a reverse shuttle gear train in parallel with said forward shuttle gear train, said forward shuttle gear train having a forward shuttle clutch selectively coupling said forward shuttle gear train with said input shaft, said forward shuttle gear train further driving said output shaft when said forward shuttle clutch is engaged, said reverse shuttle gear train having a reverse shuttle clutch selectively coupling said reverse shuttle gear train with said input shaft, said reverse shuttle gear train further driving said output shaft when said reverse shuttle clutch is engaged;

driving the at least one drive axle using said output shaft of said power-shuttle transmission;

coupling a hydraulic unit by way of a hydraulic unit clutch with said output shaft of said power-shuttle transmission, said hydraulic unit being operable to convert rotational power to hydraulic pressure and flow, and to convert hydraulic pressure and flow to rotational power; and placing a pressurized hydraulic accumulator operable to store hydraulic fluid under pressure in hydraulic communication with said hydraulic unit, wherein a first two way valve selectively provides hydraulic communication between said hydraulic unit and a reservoir, or between said hydraulic unit and a second one way valve in parallel hydraulic communication with a check valve, said check valve providing one-way hydraulic communication from said first two way valve to said pressurized hydraulic accumulator, and said second one way valve provides hydraulic communication between said pressurized hydraulic accumulator and said first two way valve.

14. The method of storing kinetic energy of claim 13, further comprising the steps of:

directly or indirectly connecting an individual control unit or ECU to the at least one service brake, to said forward shuttle clutch, to said reverse shuttle clutch, to said hydraulic unit, and to said hydraulic unit clutch;

providing input to said individual control unit or ECU from at least one of a throttle operator input device, a brake operator input device, and a shuttle clutch operator input device.

15. The method of storing kinetic energy of claim 14, further comprising the steps of:

configuring said individual control unit or ECU to, upon demand for acceleration, at least one of:

sequentially command said hydraulic unit to convert hydraulic pressure and flow from said pressurized hydraulic accumulator to rotational power delivered to said output shaft of said power-shuttle transmission, and, upon exhaustion of said hydraulic pressure and flow from said pressurized hydraulic accumulator, command one of said forward shuttle clutch and said reverse shuttle clutch to engage and deliver rotational power from said engine through one of said forward shuttle gear train and said reverse shuttle gear train to said output shaft of said power-shuttle transmission, and simultaneously command said hydraulic unit to convert hydraulic pressure and flow from said pressurized hydraulic accumulator to rotational power delivered to said output shaft of said power-shuttle transmission and command one of said forward shuttle clutch and said reverse shuttle clutch to engage and deliver rotational power from said engine through one of said forward shuttle gear train and said reverse shuttle gear train to said output shaft of said power-shuttle transmission.

16. The method of storing kinetic energy of claim 14, further comprising the steps of:

configuring said individual control unit or ECU to, upon demand for deceleration, at least one of initially command the at least one service brake to apply, and initially command one of said forward shuttle clutch and said reverse shuttle clutch to slidably engage;

further configuring said individual control unit or ECU to, upon demand for deceleration, command said hydraulic unit to convert rotational power delivered by said output shaft of said power-shuttle transmission to hydraulic pressure and flow delivered to said pressurized hydraulic accumulator; and further configuring said individual control unit or ECU to, upon build-up of a minimum amount of back-pressure sufficient for said hydraulic unit to provide a target brake torque to said output shaft of said power-shuttle transmission, at least one of command said at least one service brake to release, and command one of said forward shuttle clutch and said reverse shuttle clutch to disengage.

* * * * *